(12) United States Patent
Varghese

(10) Patent No.: US 12,401,451 B2
(45) Date of Patent: Aug. 26, 2025

(54) SIGNAL PROCESSING

(71) Applicant: Nordic Semiconductor ASA, Trondheim (NO)

(72) Inventor: George Varghese, Hyderabad (IN)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/367,937

(22) Filed: Sep. 13, 2023

(65) Prior Publication Data

US 2024/0097818 A1 Mar. 21, 2024

(30) Foreign Application Priority Data

Sep. 15, 2022 (IN) .............................. 202211052825
Nov. 16, 2022 (GB) ..................................... 2217142

(51) Int. Cl.
*H04L 1/00* (2006.01)
*H04L 27/26* (2006.01)

(52) U.S. Cl.
CPC ........ *H04L 1/0054* (2013.01); *H04L 27/2649* (2013.01)

(58) Field of Classification Search
CPC .......................... H04L 1/0054; H04L 27/2649
See application file for complete search history.

(56) References Cited

U.S. PATENT DOCUMENTS

| | | | |
|---|---|---|---|
| 9,294,173 B2 | 3/2016 | Kankipati et al. | |
| 2007/0268988 A1 | 11/2007 | Hedayat et al. | |
| 2016/0352552 A1* | 12/2016 | Liu ........................ | H04L 5/0092 |
| 2021/0112398 A1* | 4/2021 | Mishra .................. | H04W 8/205 |

FOREIGN PATENT DOCUMENTS

GB 2511370 A 9/2014

OTHER PUBLICATIONS

ISO Combined Search and Examination Report under Sections 17 and 18(3) for GB2217142.5, mailed May 16, 2023, 6 pages.
Jacob et al., "System-level Performance Comparison of IEEE 802.11p and 802.11bd Draft in Highway Scenarios," *27th International Conference on Telecommunications*, Oct. 2020, 6 pages.

* cited by examiner

*Primary Examiner* — Janice N Tieu
(74) *Attorney, Agent, or Firm* — Klarquist Sparkman, LLP

(57) ABSTRACT

A receiver apparatus is configured to receive a radio-frequency signal comprising a first subcarrier comprising first subcarrier symbols and a second subcarrier comprising second subcarrier symbols, wherein the first subcarrier symbols and the second subcarrier symbols both encode a same bit sequence in a respective first subcarrier symbol and a second subcarrier symbol. Soft-output decoder logic calculates respective log-likelihood ratios for each of the first subcarrier symbols and generates a first output sequence comprising the respective log-likelihood ratios calculated for the first subcarrier symbols and similarly generates a second output sequence. Combiner logic combines the output sequences by adding or subtracting a respective log-likelihood ratio with a respective log-likelihood ratio calculated for the respective second subcarrier symbol to obtain a combined log-likelihood ratio for a respective bit of the bit sequence, and outputs a combined output sequence comprising a respective combined log-likelihood ratio for each bit of the bit sequence.

14 Claims, 10 Drawing Sheets

SIGNAL PROCESSING

BACKGROUND OF THE INVENTION

The present disclosure relates to signal processing. In particular, the present disclosure relates to methods and apparatus for processing digitally encoded radio signals using soft bit calculations.

In digital radio communication, a radio transmitter will typically use any of a number of modulation techniques known in the art per se to alter the properties of a carrier signal such as the amplitude (amplitude modulation), the frequency (frequency modulation), and/or the phase (phase modulation) in response to binary data that is to be transmitted, the data itself being a bitstream of digital "0"s and "1"s. At the receiver side, various detection schemes are available for obtaining the bitstream from the incoming analogue waveform.

Digital radio signals can often be subject to noise and glitches that may cause uncertainty regarding whether a received bit was a digital "0" or "1". It is therefore important to correctly determine the bit value in order for the data contained within the received signal to be useful.

Orthogonal Frequency Division Multiplexing (OFDM) is a form of radio transmission that is used in various radio protocols such as Long Term Evolution (LTE™), various IEEE™ 802.11 standards, DAB™ radio, DVB-T, and WiMAX™. Rather than encoding data on a single carrier frequency, a data stream is spread over some or all of a radio channel containing multiple subcarriers. The modulated subcarriers are typically closely spaced, at regular intervals, across the frequency spectrum, although this is not essential. The modulated subcarriers are orthogonal to avoid mutual interference. Therefore, the introduction of frequency domain diversity means that OFDM techniques can provide good resilience to multipath fading and to external interference and are thus often used for digital radio communication.

Dual carrier modulation (DCM) is a form of radio transmission that provides frequency diversity in OFDM systems by simultaneously transmitting the same information on two different subcarriers within an OFDM symbol. The frequencies of the two subcarriers may be spaced relatively far apart within a channel. DCM can help provide robustness to narrow-band interference and provide range extension. It is used, for instance, in the IEEE 802.11ax standard for High-Efficiency (HE) transmissions.

A receiver apparatus, such as a cellular user equipment (UE) device or a WiFi™ station (STA), can thus receive a radio signal comprising a plurality of subcarriers and process the subcarriers to recover one or more bitstreams. One approach is to simply perform a thresholding operation for each received bit, assigning each a definitive "0" or "1" value for each bit depending on which it is closer to. Such approaches make a "hard" (i.e. definitive) decision regarding the value that should be assigned based on instantaneous observations.

However, the applicant has recognised that there is potential for further improving the reliable decoding of data from dual-carrier-modulated signals. Thus the invention seeks to provide improved approaches to decoding radio-frequency (RF) signals.

SUMMARY OF THE INVENTION

According to a first aspect of the present invention, there is provided a receiver apparatus comprising:

receiving circuitry configured to receive a radio-frequency signal comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective symbol period, and wherein the first and second subcarriers have a same type of modulation and different subcarrier frequencies;

soft-output decoder logic configured to:
  calculate one or more respective log-likelihood ratios for each of the first subcarrier symbols and generate a first output sequence comprising the respective log-likelihood ratios calculated for the first subcarrier symbols; and
  calculate one or more respective log-likelihood ratios for each of the second subcarrier symbols and generate a second output sequence comprising the respective log-likelihood ratios calculated for the second subcarrier symbols; and combiner logic configured to:
  combine the first output sequence and the second output sequence to obtain a combined output sequence, wherein the combiner logic is configured to add or subtract a respective log-likelihood ratio calculated for each first subcarrier symbol with a respective log-likelihood ratio calculated for the respective second subcarrier symbol to obtain a combined log-likelihood ratio for a respective bit of the bit sequence; and
  output the combined output sequence comprising a respective combined log-likelihood ratio for each bit of the bit sequence.

The invention also extends to a method comprising:

receiving a radio-frequency signal comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective subcarrier symbol period, and wherein the first and second subcarriers have a same type of modulation and different subcarrier frequencies;

calculating one or more respective log-likelihood ratios for each of the first subcarrier symbols and determining a first output sequence comprising the respective log-likelihood ratios calculated for the first subcarrier symbols;

calculating one or more respective log-likelihood ratios for each of the second subcarrier symbols and determining a second output sequence comprising the respective log-likelihood ratios calculated for the second subcarrier symbols; and combining the first output sequence and the second output sequence to determine a combined output sequence comprising a respective combined log-likelihood ratio for each bit of the bit sequence, wherein combining the first output sequence and the second output sequence comprises adding or subtracting a respective log-likelihood ratio calculated for each first subcarrier symbol with a respective log-likelihood ratio calculated for the respective second subcarrier symbol to obtain a combined log-likelihood ratio for a respective bit of the bit sequence.

The invention also extends to computer software (and to a non-transitory computer-readable medium storing the same), which when executed by a receiver apparatus, causes the receiver apparatus to:

process data representative of a received radio signal comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective symbol period, and wherein the first and second subcarriers have a same type of modulation and different subcarrier frequencies;

calculate one or more respective log-likelihood ratios for each of the first subcarrier symbols and determine a first output sequence comprising the respective log-likelihood ratios calculated for the first subcarrier symbols;

calculate one or more respective log-likelihood ratios for each of the second subcarrier symbols and determine a second output sequence comprising the respective log-likelihood ratios calculated for the second subcarrier symbols; and combine the first output sequence and the second output sequence to determine a combined output sequence comprising a respective combined log-likelihood ratio for each bit of the bit sequence, wherein combining the first output sequence and the second output sequence comprises adding or subtracting a respective log-likelihood ratio calculated for each first subcarrier symbol with a respective log-likelihood ratio calculated for the respective second subcarrier symbol to obtain a combined log-likelihood ratio for a respective bit of the bit sequence.

Impairment of the quality of the first and/or second subcarrier (e.g. due to external factors such as noise and interference) can result in errors when decoding the received radio-frequency signal. A receiver apparatus in accordance with embodiments of the present invention may comprise soft-output decoder logic that independently soft-decodes the first plurality of subcarrier symbols and the second plurality of subcarrier symbols to generate the first output sequence comprising the respective log-likelihood ratios (LLRs) calculated for the first subcarrier symbols and the second output sequence comprising the respective log-likelihood ratios (LLRs) calculated for the second subcarrier symbols. Since the first subcarrier symbols and the second subcarrier symbols both encode the same bit sequence, the first output sequence and the second output sequence include LLRs relating to the same respective bits. An LLR in the first output sequence and an LLR in the second output sequence which both relate to a same respective bit have frequency diversity due to being decoded from the first and second subcarriers respectively. The combiner logic is configured to obtain a combined LLR for a respective bit by combining a respective LLR from the first output sequence with a respective LLR from the second output sequence by performing LLR addition for two LLRs or performing LLR subtraction for the two LLRs. These operations can be efficiently implemented thereby enabling a particularly efficient combining process. By using the soft-output decoder logic to obtain the first and second output sequences and the combiner logic to perform LLR combining, a receiver apparatus embodying the invention may achieve improved bit error rate (BER) performance compared to techniques that decode only the first plurality of subcarrier symbols or only the second plurality of subcarrier symbols.

The resulting combined output sequence output by the combiner logic may be output for further use by the receiver apparatus, such as by hard-output decoding logic optionally provided as part of the receiver apparatus, or may be output to another device for processing by the another device. In particular, a hard decoding of the combined LLRs of the combined output sequence may be performed to obtain a hard-bit sequence representing the bit sequence. Hence, in some embodiments the receiver apparatus further comprises hard-output decoder logic configured to output, in dependence upon the combined output sequence, a hard-bit sequence for representing the bit sequence redundantly encoded by the first and second subcarriers.

The radio-frequency signal may be any type of signal. It may be an OFDM signal. It may be modulated using Dual Carrier Modulation (DCM). In some embodiments it is an IEEE 802.11ax signal, such a High Efficiency (HE) physical-layer protocol data unit (PPDU).

The radio-frequency signal may comprise further subcarriers comprising further subcarrier symbols. The bit sequence encoded by the first and second subcarriers may be only a subsequence of a longer message sequence that is encoded across these further subcarriers in addition to the first and second subcarriers. The further subcarriers may comprise further pairs of subcarriers that are modulated using DCM. The combiner logic may be configured to generate a respective combined log-likelihood ratio for each bit of the message sequence. The hard-output decoding logic may be configured to obtain a hard-bit sequence representing the message sequence.

The respective sets of one or more bits may each contain one, two, four, or more bits. The size of the sets may depend on the type of modulation used—e.g. containing only a single bit when using a binary modulation. The bit sequence may be a single symbol period in length or it may extend over a plurality of symbol periods.

In some embodiments, the first subcarrier and the second subcarrier have a phase-based type of modulation and a phase-transform operation has been applied so that the second subcarrier is phase-transformed with respect to the first subcarrier. A phase-transform may be applied at a transmitter-side so that the receiver apparatus receives the second subcarrier being in a phase-transformed state with respect to the first subcarrier whilst still encoding a same bit sequence. For example, in the case of BPSK modulation (which is an example of a phase-based type of modulation) of the first and second subcarriers, one of the subcarriers may be inverted with respect to the other such that the channel coefficients are inverted for the subcarriers. Alternatively, in the case of QPSK modulation (which is another example of a phase-based type of modulation) of the first and second subcarriers, one of the subcarriers may encode a conjugated version of the other. In the case of a phase-based type modulation and one of the received subcarriers being in a phase-transformed state, the receiver apparatus may perform a subtraction of one LLR relating to a respective bit from another LLR relating to the respective bit to obtain a combined LLR for the respective bit, or the receiver apparatus may perform soft-decoding with respect to the subcarrier symbols of the phase-transformed subcarrier using a transformed (e.g. inverted or conjugate) version of a channel response matrix for the phase-transformed subcarrier and then add each of the obtained LLRs to a respective LLR determined from the non-phase-transformed subcarrier.

In some embodiments the soft-output decoder logic comprises Multiple Input Multiple Output (MIMO) decoder logic. It may be configured to use one or more MIMO channel matrices when calculating the log-likelihood ratios.

In some embodiments the combiner logic is configured to add each log-likelihood ratio calculated for the first subcarrier symbols to a respective log-likelihood ratio calculated for the second subcarrier symbols to obtain a respective combined log-likelihood ratio. This may be appropriate when the signal is transmitted using a phase-based modulation, such as BPSK or QPSK, with no phase transformation applied to the first or second subcarriers.

But in some embodiments the combiner logic is configured to subtract at least one respective log-likelihood ratio calculated for each second subcarrier symbol from at least one respective log-likelihood ratio calculated for the respective first subcarrier symbol to obtain at least one respective combined log-likelihood ratio. In the case where a phase-transformation has been applied for the second subcarrier at a transmitter side, the soft-output decoder logic may generate the first output sequence and the second output sequence and at least one LLR of the second output sequence may be subtracted from an LLR of the first output sequence to obtain a combined LLR that corresponds to a respective bit of the bit sequence transmitted by the first and second subcarriers. Consequently, LLR subtraction can be performed to thereby obtain a combined LLR even though the second subcarrier has been inverted or conjugated relative to the first subcarrier.

However, rather than compensating for a phase-transformation having been applied to one of the first and second subcarriers at the transmitter side by performing the above mentioned LLR subtraction, in some embodiments the soft-output decoder logic is configured to calculate at least one respective log-likelihood ratio for each of the second subcarrier symbols in dependence upon a transformed channel matrix for the second subcarrier, and the combiner logic is configured to add each respective log-likelihood ratio calculated for the respective second subcarrier symbol to a respective log-likelihood ratio calculated for the respective first subcarrier symbol. The soft-output decoder logic may perform soft decoding for the second subcarrier symbols of the second subcarrier (when the phase-transformation has been applied for second subcarrier) using a transformed channel matrix for the second subcarrier. Therefore, the phase-transformation with respect to the second subcarrier may be compensated for by the soft-output decoder logic and the calculated LLRs can be combined using LLR addition. Consequently, LLR addition can be performed to thereby obtain a combined LLR even though the second subcarrier has been inverted or conjugated relative to the first subcarrier.

In some embodiments, the first subcarrier and the second subcarrier are both modulated using Binary Phase Shift Keying (BPSK), and the combiner logic is configured to add the respective log-likelihood ratio calculated for each first subcarrier symbol to the respective log-likelihood ratio calculated for the respective second subcarrier symbol to obtain the respective combined log-likelihood ratio. BPSK modulation may be used for both the first subcarrier and the second subcarrier such that each respective first subcarrier symbol of the first subcarrier encodes a single respective bit and each respective second subcarrier symbol of the second subcarrier encodes a single respective bit. For a first subcarrier symbol and a second subcarrier symbol corresponding to a same respective symbol period, the soft-output decoder logic may calculate a first LLR for each first subcarrier symbol and calculate a second LLR for the respective second subcarrier symbol, and the combiner logic may add the first LLR and the second LLR to obtain a combined LLR for the respective bit of the transmitted bit sequence. Therefore, two BPSK modulated subcarriers may be separately soft-decoded and the resulting LLRs can be added to obtain the combined output sequence such that the receiver apparatus can achieve improved bit error rate performance.

In some embodiments, the first subcarrier and the second subcarrier are both modulated using Binary Phase Shift Keying (BPSK) and the second subcarrier is inverted with respect to the first subcarrier, and the combiner logic is configured to subtract the respective log-likelihood ratio calculated for each second subcarrier symbol from the respective log-likelihood ratio calculated for the respective first subcarrier symbol to obtain the respective combined log-likelihood ratio. In some cases, an inversion phase-transformation may have been applied with respect to the second subcarrier so that the second subcarrier is inverted with respect to the first subcarrier. In this case, the first output sequence and second output sequence can be generated for the first subcarrier symbols and the second subcarrier symbols, respectively. In order to account for the inversion, an LLR calculated for a second subcarrier symbol may be subtracted from an LLR calculated for a first subcarrier symbol. Therefore, LLR subtraction can be performed by the combiner logic to thereby obtain a combined LLR even though the second subcarrier has been inverted relative to the first subcarrier.

In some embodiments, the first subcarrier and the second subcarrier are both modulated using Binary Phase Shift Keying (BPSK) and the second subcarrier is inverted with respect to the first subcarrier, and the soft-output decoder logic is configured to calculate, for each of the second subcarrier symbols, one or more respective log-likelihood ratios (this would typically be exactly one, but might possibly more, e.g. if handling multiple users in a multi-user MIMO scenario) in dependence upon an inverted channel matrix for the second subcarrier and generate the second output sequence comprising the respective log-likelihood ratios calculated for the second subcarrier symbols. The combiner logic may be configured to add the respective log-likelihood ratio calculated for each first subcarrier symbol to the respective log-likelihood ratio calculated for the respective second subcarrier symbol to obtain the respective combined log-likelihood ratio. The soft-output decoder logic may use a channel matrix for the first subcarrier whist using an inverted channel matrix for the second subcarrier so as to account for the inversion for the second subcarrier. In this way, the first and second output sequences each comprise LLRs and the combiner logic may perform LLR addition for an LLR from the first output sequence and an LLR from the second output sequence to obtain a combined LLR that provides more reliable decoding of the transmitted bit stream that can achieve improved bit error rate performance.

In some embodiments, the first subcarrier and the second subcarrier are both modulated using Quadrature Phase Shift Keying (QPSK) with a phase-transformation (e.g. conjugation) applied to one of the subcarriers (e.g. the second subcarrier). In such embodiments, the soft-output decoder logic may be configured to calculate two respective log-likelihood ratios for each of the first subcarrier symbols and to calculate two respective log-likelihood ratios for each of the second subcarrier symbols. For each first subcarrier symbol and respective second subcarrier symbol corresponding to a respective common symbol period, the combiner logic may be configured to: add a first respective log-likelihood ratio calculated for the first subcarrier symbol to a first respective log-likelihood ratio calculated for the second subcarrier symbol to obtain a first combined log-likelihood ratio; and subtract a second respective log-likelihood ratio calculated for the second subcarrier symbol from a second respective log-likelihood ratio calculated for the first subcarrier symbol to obtain a second combined log-likelihood ratio. QPSK modulation may be used for both the first subcarrier and the second subcarrier such that each respective first subcarrier symbol of the first subcarrier encodes two respective bits and each respective second subcarrier symbol of the second subcarrier also encodes two respective bits. For a first subcarrier symbol and a second subcarrier symbol occupying a same symbol period, the soft-output decoder logic may calculate a first LLR and a second LLR for the first subcarrier symbol and also calculate a first LLR and a second LLR for the second subcarrier symbol. In particular, the soft-output decoder logic may use a first channel matrix for the first subcarrier and also use a second channel matrix for the second subcarrier and any suitable soft-output decoder algorithm (e.g. a MIMO decoder algorithm) to generate the first output sequence of LLRs for the first subcarrier and generate the second output sequence of LLRs for the second subcarrier. The combiner logic may perform LLR addition to add the first LLR for the first subcarrier symbol and the first LLR for the second subcarrier symbol. In addition, the combiner logic may perform LLR subtraction to subtract the second LLR for the second subcarrier symbol from the second LLR for the first subcarrier symbol. Therefore, two QPSK modulated subcarriers may be separately soft-decoded and at least one combined LLR may be obtained by performing LLR addition and at least one combined LLR may be obtained by performing LLR subtraction. The LLR subtraction may be performed by the combiner logic for the two second LLRs to thereby obtain a combined LLR even though the second subcarrier has been encoded using a QPSK scheme using an inverted state for a bit defined with respect to the imaginary axis. Therefore, two respective combined LLRs may be obtained for each pair of first and second subcarrier symbols corresponding to a same symbol period, and the resulting combined output sequence can achieve improved bit error rate performance.

In some embodiments, the first respective log-likelihood ratio calculated for a first subcarrier symbol of the first subcarrier and the first respective log-likelihood ratio calculated for the respective second subcarrier symbol of the second subcarrier correspond to one respective bit of the bit sequence, and the second respective log-likelihood ratio calculated for the first subcarrier symbol and the second respective log-likelihood ratio calculated for the second subcarrier symbol correspond to another respective bit of the bit sequence. Therefore, in the case of QPSK modulation with a phase-transformation applied to one of the subcarriers, the two LLRs calculated for each subcarrier symbol relate to two respective bits of the transmitted bit sequence, and a first of the two LLRs may be used in an LLR addition operation to obtain a first combined LLR and a second of the two LLR may be used in an LLR subtraction operation to obtain a second combined LLR. In particular, for QPSK modulation using a constellation pattern having four constellation points defined with respect to real and imaginary axes, such that each subcarrier symbol encodes a so-called real-bit and an imaginary-bit, LLR addition may be performed to obtain a first combined LLR for the real-bit and LLR subtraction may be performed to obtain a second combined LLR for the imaginary-bit. The LLR subtraction may account for the phase-transform (conjugate transform) applied to the second subcarrier at the transmitter side.

In some embodiments, the first subcarrier and the second subcarrier are both modulated using Quadrature Phase Shift Keying (QPSK), and the soft-output decoder logic is configured to: calculate, for each of the first subcarrier symbols, two respective log-likelihood ratios in dependence upon a channel matrix for the first subcarrier; and calculate, for each of the second subcarrier symbols, two respective log-likelihood ratios in dependence upon a conjugated channel matrix and a conjugated received symbol for the second subcarrier. The combiner logic may be configured, for the respective first subcarrier symbol and second subcarrier symbol corresponding to each symbol period, to: add a first log-likelihood ratio calculated for the first subcarrier symbol to a first log-likelihood ratio calculated for the second subcarrier symbol to obtain a first-bit combined log-likelihood ratio; and add a second log-likelihood ratio calculated for the second subcarrier symbol to a second log-likelihood ratio calculated for the first subcarrier symbol to obtain a second-bit combined log-likelihood ratio. The soft-output decoder logic may use a first channel matrix for soft-decoding the first subcarrier and may use a conjugated channel matrix for soft-decoding the second subcarrier. The first and second output sequences may thus be generated for the first and second subcarriers, respectively, and the combiner logic may, for each symbol period, perform LLR addition to add the first LLR for the first subcarrier symbol to the first LLR for the second subcarrier symbol, and also perform LLR addition to add the second LLR for the first subcarrier symbol to the second LLR for the second subcarrier symbol. Therefore, each combined LLR of the combined output sequence may be obtained using LLR addition even though a phase-transformation has been applied for the second subcarrier.

In some embodiments, the first subcarrier and the second subcarrier are both modulated using 16-Quadrature Amplitude Modulation (QAM), and the soft-output decoder logic is configured to: calculate, for each of the first subcarrier symbols, four respective log-likelihood ratios and generate the first output sequence comprising the respective log-likelihood ratios calculated for the first subcarrier symbols; and calculate, for each of the second subcarrier symbols, four respective log-likelihood and generate the second output sequence comprising the respective log-likelihood ratios calculated for the second subcarrier symbols. Assuming an indexing of the output sequences from zero upwards, the combiner logic may be configured, for each integer J that is a multiple of four and less the length of the bit sequence, to: add a respective log-likelihood ratio corresponding to a sequence position J in the first output sequence to a respective log-likelihood ratio corresponding to a sequence position J+1 in the second output sequence to obtain a first combined log-likelihood ratio; add a respective log-likelihood ratio corresponding to a sequence position J+1 in the first output sequence to a respective log-likelihood ratio corresponding to a sequence position J in the second output sequence to obtain a second combined log-likelihood ratio; add a respective log-likelihood ratio corresponding to a sequence position J+2 in the first output sequence to a respective log-likelihood ratio corresponding to a sequence position J+3 in the second output sequence to obtain a third combined log-likelihood ratio; and add a respective log-likelihood ratio corresponding to a sequence position J+3 in the first output sequence to a respective log-likelihood ratio corresponding to a sequence position J+2 in the second output sequence to obtain a fourth combined log-likelihood ratio.

16QAM may be used for both the first subcarrier and the second subcarrier such that each respective first subcarrier symbol of the first subcarrier encodes four respective bits and each respective second subcarrier symbol of the second subcarrier also encodes four respective bits. For a first subcarrier symbol and a second subcarrier symbol corresponding to a same respective symbol period, the soft-output decoder logic may calculate a first, second, third and fourth LLR for the first subcarrier symbol and also calculate a first, second, third and fourth LLR for the second subcarrier symbol. In particular, the soft-output decoder logic may use a first channel matrix for the first subcarrier and may also use a second channel matrix for the second subcarrier and any suitable soft-output decoder algorithm to generate the first output sequence of LLRs for the first subcarrier and generate the second output sequence of LLRs for the second subcarrier. The combiner logic may perform LLR addition to add a respective LLR in the first output sequence to a respective LLR in the second output sequence. However, due to the use of a different bit ordering for the first and second subcarriers, LLR addition is performed by adding LLRs having different sequence positions in the two output sequences.

Generally, a first sequence of four LLRs ($LLR_{m,0}$; $LLR_{m,1}$; $LLR_{m,2}$; $LLR_{m,3}$) may be generated for each respective first subcarrier symbol of the first subcarrier m, and a second sequence of four LLRs ($LLR_{n,0}$; $LLR_{n,1}$; $LLR_{n,2}$; $LLR_{n,3}$) may be generated for each respective second subcarrier symbol of the second subcarrier. An LLR at the $0^{th}$ sequence position of the first sequence may be added to an LLR at the $1^{st}$ sequence position of the second sequence to account for the different bit ordering of the two subcarriers. Similarly, an LLR at the $1^{st}$ sequence position of the first sequence may be added to an LLR at the $0^{th}$ sequence position of the second sequence to account for the different bit ordering of the two subcarriers. An LLR at the $2^{nd}$ sequence position of the first sequence may be added to an LLR at the $3^{rd}$ sequence position of the second sequence to account for the different bit ordering of the two subcarriers. An LLR at the $3^{rd}$ sequence position of the first sequence may be added to an LLR at the $2^{nd}$ sequence position of the second sequence to account for the different bit ordering of the two subcarriers. Hence, even though a first subcarrier symbol and second subcarrier symbol occupying the same symbol period may encode the transmitted bit sequence using a different ordering of the respective bits, the combiner logic may be configured to perform LLR addition to obtain the combined output sequence and the resulting combined output sequence can achieve improved bit error rate performance.

The receiver apparatus may comprise one or more processors. It may comprise memory storing software as disclosed herein for execution by the one or more processors. The soft-output decoder logic may be provided by soft-output decoder circuitry (i.e. in hardware) or by soft-output decoder software, or by a combination of hardware and software. Similarly, the combiner logic may be provided by combiner circuitry (i.e. in hardware) or by combiner software, or by a combination of hardware and software. Also, the hard-output decoder logic may be provided by hard-output decoder circuitry (i.e. in hardware) or by hard-output decoder software, or by a combination of hardware and software.

In some embodiments, the receiver apparatus is an integrated circuit. It may be a radio-on-a-chip. However, in other embodiments it may be or form part of any type of electrical device. It may comprise one or more integrated circuit and/or circuitry formed of discrete electrical components.

In some embodiments, the receiver apparatus may comprise an electrical interface for receiving the radio-frequency signal as an electrical signal—e.g. from an off-chip antenna. In another set of embodiments, the receiver apparatus may comprise an antenna for receiving the radio-frequency signal as a radio signal.

According to another aspect of the present invention there is provided a system comprising the receiver apparatus according to any of the configurations above, and a transmitter apparatus configured to transmit the radio-frequency signal to the receiver apparatus as a radio signal.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the present invention will now be described, by way of example only, and with reference to the accompanying drawings, in which.

DETAILED DESCRIPTION

In the following description, a number of specific details are presented in order to provide a thorough understanding of the aspects of the present disclosure. It will be apparent, however, to a person skilled in the art that these specific details need not be employed to practice the techniques of the present disclosure. Conversely, specific details known to the person skilled in the art are omitted for the purposes of clarity where appropriate.

Figure 1:
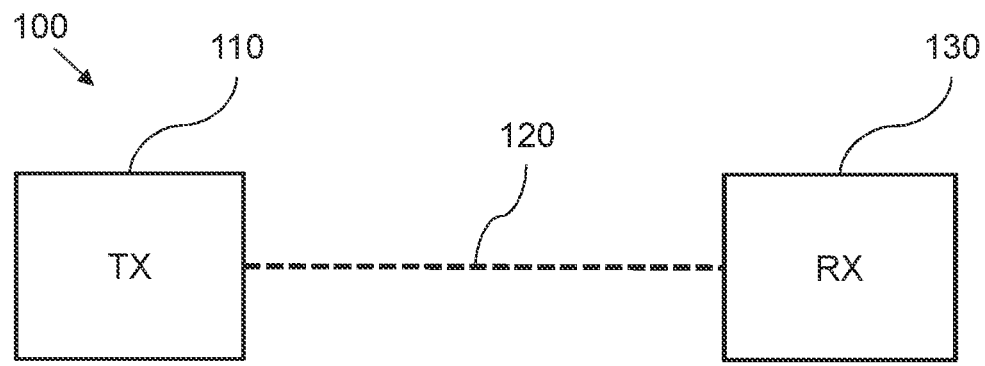
FIG. 1 is a schematic diagram illustrating an example of a radio communication system in accordance with embodiments of the present invention.

FIG. 1 schematically illustrates an example of a radio communication system 100 comprising a transmitter apparatus (TX) 110 and a receiver apparatus (RX) 130 operable to communicate via a radio link 120. In the example shown, there is a single transmitter apparatus 110 and a single receiver apparatus 130, however it will be understood that the system 100 may comprise any suitable number of devices and in some examples the receiver apparatus 130 may receive radio signals from a plurality of transmitter apparatuses and/or the transmitter apparatus 110 may transmit radio signals to a plurality of receiver apparatuses. For example, the receiver apparatus 130 may be a first WLAN mobile station (STA) (e.g. a laptop computer) and the transmitter apparatus 110 may be a WLAN access point (AP) or a second mobile station (STA). More generally, the receiver apparatus 130 is operable to receive radio signals from the transmitter apparatus 110 via the radio link 120. The radio communication system 100 represents an example system that can be used to implement the techniques of the present disclosure. The receiver apparatus 130 may be the receiver apparatus 300 as described in greater detail below.

Generally, the transmitter apparatus 110 comprises: a modulator such as a frequency modulator, amplitude modulator or phase modulator operable to modulate a signal having a radio-frequency carrier frequency with data corresponding to a bit-stream; amplifier circuitry operable to amplify the modulated signal; and transmission circuitry (e.g. one or more transmit antennas) operable to transmit the amplified signal as a radio signal.

Examples of suitable modulation techniques which may be used in embodiments of the disclosure include: Binary Phase Shift Keying (BPSK); Quadrature Phase Shift Keying (QPSK); and Quadrature Amplitude Modulation (QAM), such as 16QAM. At least in some embodiments, the transmitter apparatus 110 is operable to transmit a radio signal comprising at least one carrier modulated using any of the modulation techniques above, in which the carrier comprises a plurality of successive symbol intervals each having a symbol duration. In some cases, the carrier transmitted by the transmitter apparatus 110 (and received by the receiving device 130) may comprise a plurality of successive symbol intervals in which a guard interval is provided between at least some of the symbol intervals. For example, a guard interval may be provided after each symbol interval to provide a specified period of time before the next symbol interval. Any suitable time period may be used for such a guard interval.

The radio signal may be an Orthogonal Frequency Division Multiplexing (OFDM) signal. OFDM is a form of radio transmission that is used in various radio protocols such as Long Term Evolution (LTE™), various IEEE™ 802.11 standards, DAB™ radio, DVB-T, and WiMAX™. Rather than encoding data on a single carrier frequency, a data stream is spread over some or all of a radio channel containing multiple subcarriers. The modulated subcarriers are typically closely spaced, at regular intervals, across the frequency spectrum, although this is not essential. The modulated subcarriers are orthogonal to avoid mutual interference. Therefore, the introduction of frequency domain diversity means that OFDM techniques can provide good resilience to multipath fading and to external interference and are thus often used for digital radio communication.

Figure 2:
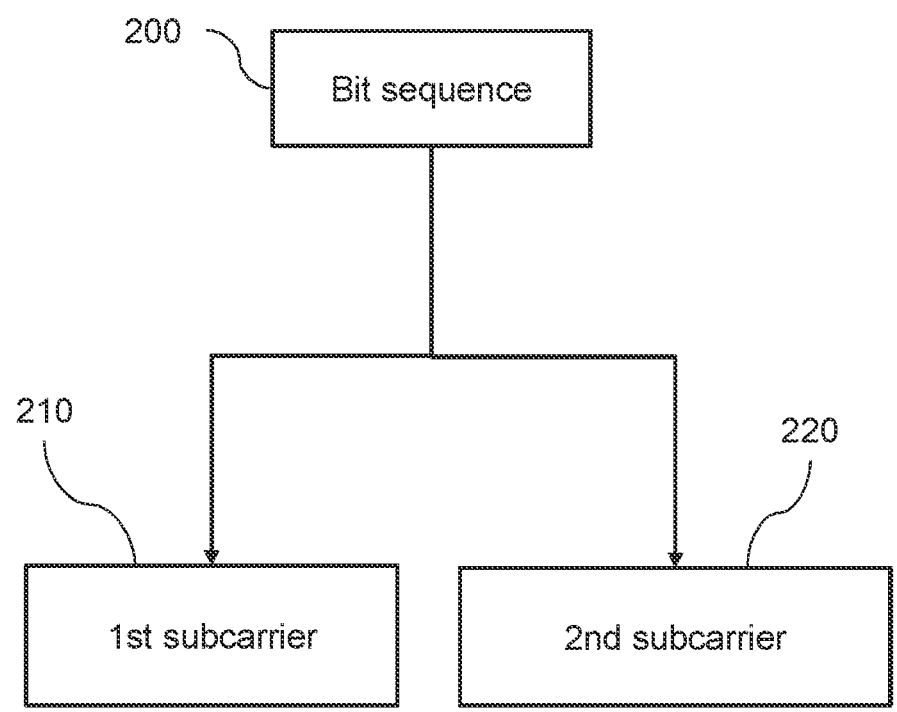
FIG. 2 is a schematic flowchart illustrating an example of an Dual Carrier Modulation (DCM) radio transmission scheme for encoding a bit sequence.

FIG. 2 schematically illustrates an example of a Dual Carrier Modulation (DCM) radio transmission scheme for encoding a bit sequence 200 of N bits onto two subcarriers having different subcarrier frequencies. These may be different subcarriers of an OFDM signal, e.g. an 802.11ax signal. The bit sequence 200 may be a subsequence of a longer message sequence, and other bits of the message sequence may be DCM encoded on further pairs of subcarrier frequencies of the signal. The DCM scheme of FIG. 2 can be applied at a transmitter device to modulate the same encoded bits onto two subcarriers using the same type of modulation. The DCM scheme of FIG. 2 can thus introduce frequency domain diversity for a transmitted bit sequence 200 thereby enhancing the reliability of transmissions, which can be particularly beneficial for long range applications. The transmitter apparatus 110 may implement such a scheme.

Referring to FIG. 2, a bit sequence 200 to be used for subcarrier modulation is obtained. These bits may be only a subsequence of a longer message sequence that is modulated across a larger number of subcarriers of the OFDM signal. A first subcarrier 210 having a first subcarrier frequency is modulated using the bit sequence, and a second subcarrier 220 having a second subcarrier frequency is modulated using the bit sequence. For example, a phase-based type of modulation, such as BPSK or QPSK may be used for the modulation of the subcarriers 210, 220.

In accordance with the scheme in FIG. 2, the sequence of N-bits is used to redundantly encode two subcarriers with the same information. The sequence of N-bits may correspond to some or all of any suitable bit-stream to be transmitted, and N may be any suitable integer value. In some examples, the sequence of N-bits may correspond to bits from a data field of a WLAN packet—e.g. an 802.11ax frame. In some examples, the sequence of N-bits may correspond to some or all of a convolutional code. For example, a bit sequence included in a field of a data packet may be encoded using a convolutional encoder to obtain a convolutional code from which a subsequence of N bits may be extracted (with other subsequences being modulated on further subcarriers of the OFDM signal); optionally, interleaving of the convolutional code may be performed before extracting the sequence of N-bits shown in FIG. 2. Using the techniques to be discussed below, the sequence of N-bits shown in FIG. 2 can be recovered at a receiver-side by separately soft-decoding both the first and second subcarriers. Optionally (e.g. in the case of the sequence of N-bits being generated from a convolutional code or a bit-interleaved convolutional code) a convolutional decoding step and/or one or more interleaving/de-interleaving operations may also be performed at the receiver-side.

Hence more generally, a receiver apparatus 130 can receive a radio-frequency signal comprising the first and second subcarriers as shown in FIG. 2. The receiver apparatus could naïvely decode just one of the first subcarrier and the second subcarrier so as to recover the transmitted bit sequence. Thus, for a straightforward implementation decoding of either the first subcarrier or the second subcarrier using hard decision decoding could be performed to obtain a hard output comprising binary values representing the estimate for the original bit sequence.

However, digital radio signals can often be subject to external factors that may cause uncertainty regarding whether a received bit was a digital "0" or "1". In particular, the applicants have realised that impairment to the quality of the subcarriers can lead to poor bit error rate (BER) performance when using a naïve hard decision decoding for a single subcarrier. Impairment of the quality of the subcarriers can be particularly problematic for extended range applications, such as those involving the High Efficiency (HE) WLAN. The applicants have identified that improved bit error rate performance can be achieved for a radio-frequency signal comprising first and second subcarriers as described above.

Figure 3:
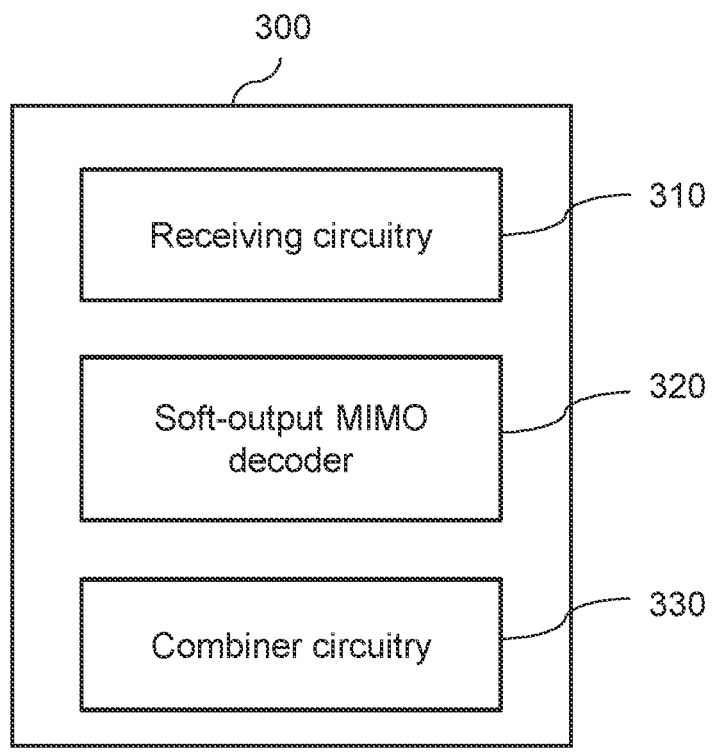
FIG. 3 is a schematic diagram illustrating a receiver apparatus in accordance with embodiments of the present invention.

FIG. 3 schematically illustrates a receiver apparatus 300 in accordance with embodiments of the invention. The receiver apparatus 300 comprises receiving circuitry 310, soft-output Multiple Input Multiple Output (MIMO) decoder circuitry 320 and combiner circuitry 330.

The receiving circuitry 310 receives a radio-frequency signal according to the techniques discussed above with reference to FIG. 2, such that the received radio-frequency signal comprises at least the first subcarrier and the second subcarrier each encoding a same bit sequence.

The receiver apparatus 300 in accordance with the invention comprises the soft-output MIMO decoder circuitry 320 that generates a first output sequence comprising log-likelihood ratios (LLRs) for the first plurality of subcarrier symbols of the first subcarrier and also generates a second output sequence comprising LLRs for the second plurality of subcarrier symbols of the second subcarrier. In particular, through use of the classical MIMO equation $X_m = T(H_m)d_m + W_m$, LLRs can be computed for the first subcarrier symbols of the first subcarrier and also for the second subcarrier symbols of the second subcarrier. In the above expression, $X_m$ represents the signal received at the receiver apparatus 300 for a subcarrier symbol of a subcarrier m, $H_m$ represents a MIMO channel matrix for the subcarrier m, $d_m$ represents the data transmitted for the subcarrier symbol, $W_m$ represents a noise component, and T represents a phase-transformation that may have optionally been applied at a transmitter side. Therefore, using a channel observation $X_m$ and a suitable soft-decoder algorithm (e.g. any conventional soft-output MIMO decoding algorithm such as a maximum likelihood algorithm), one or more LLRs can be calculated for each subcarrier symbol of the received subcarriers.

In MIMO implementations data is transmitted as a transmit vector of values from one or multiple transmitting antennas and received as a receive vector of values at one or multiple receiving antennas. The receiver apparatus 300 can thus receive a transmitted analog signal that corresponds to the transmit vector multiplied by the channel matrix H, which represents the effect of the MIMO channel on the transmit vector as it is transmitted over the MIMO channel. A more detailed explanation of the operation of the soft-output MIMO decoder circuitry 320 is provided in U.S. Pat. No. 9,294,173 B2, the entire contents of which are incorporated herein by reference.

Hence more generally, a radio-frequency signal can be communicated via a plurality of different signal paths and combining the plural versions of the transmitted signal at the receiver apparatus can mitigate fading effects. The soft-output MIMO decoder circuitry 320 generates the first output sequence comprising LLRs calculated for the first subcarrier symbols and also generates the second output sequence comprising LLRs calculated for the second subcarrier symbols. The two output sequences are thus obtained independently of each other. The combiner circuitry 330 combines the first output sequence and the second output sequence to obtain a combined output sequence comprising combined LLRs, in which a combined LLR is obtained either by performing LLR addition or LLR subtraction for a respective LLR in the first output sequence and another respective LLR in the second output sequence.

Consequently, for a respective combined LLR of the combined output sequence obtained by combining a first respective LLR from the first output sequence and a second respective LLR from the second output sequence, the first and second respective LLRs have frequency-domain diversity and also space-domain diversity (due to the use of multiple-input multiple-output) thus providing more reliable decoding. Moreover, the use of the soft-output MIMO decoder circuitry 320 to obtain the first and second LLR sequences and the combiner logic to combine LLRs from the two LLR sequences (using arithmetic combination), is such that the combined output sequence provides improved bit error rate performance compared to, for example, a receiver apparatus using a hard-output decoder to hard-decode either the first subcarrier symbols or the second subcarrier symbols.

The combiner circuitry 330 is configured to combine an LLR from the first output sequence with an LLR from the second output sequence to obtain a combined LLR using arithmetic operations for the respective LLRs. Combining of two LLRs is achieved by performing LLR addition or by performing LLR subtraction. As explained in more detail below, the receiver apparatus 300 can be configured to obtain the combined output sequence comprising respective combined LLRs and different processing operations can be performed for different types of subcarrier modulation.

Figure 4:
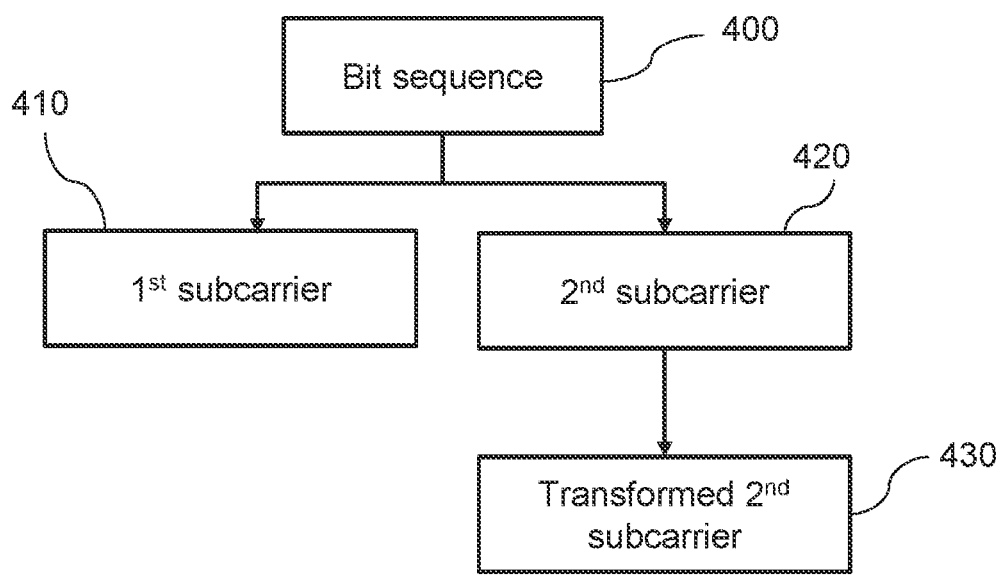
FIG. 4 is a schematic flowchart illustrating an example of dual carrier modulation in which a phase-transformation is performed for one of the subcarriers.

FIG. 4 schematically illustrates an example of a Dual Carrier Modulation (DCM) radio transmission scheme for encoding a bit sequence 400 of N bits onto at least two subcarriers 410, 420 having different subcarrier frequencies, in which a phase-transformation is applied to one of the two subcarriers 410 to generate a transformed subcarrier 430. The example shown in FIG. 4 differs from that shown in FIG. 2 in that a phase-transformation has been applied with respect to the second subcarrier 420. However, it will be understood that the phase-transformation may instead be applied to the first subcarrier 421. More generally, the receiving circuitry 310 can receive a radio-frequency signal comprising at least a first subcarrier 410 and a second subcarrier 420 that encode a same bit sequence, and in some cases a phase-transformation (such as an inversion operation or a conjugate operation) has been applied with respect to one of the first and second subcarriers 410, 420. Furthermore, whilst FIG. 4 shows an example in which a phase-transformation is applied to a modulated subcarrier 410, in some examples the phase-transformation may instead be achieved by performing a transformation on the bit-sequence 400 prior to being used in the modulation, or the phase-transformation may be applied by using two different modulation schemes (e.g. a first BPSK modulation scheme and a second BPSK modulation scheme).

For example, in the case of BPSK in which a respective subcarrier symbol encodes a respective bit, an inversion may be achieved by inverting each bit of the bit sequence and using a same BPSK modulation scheme (using a same constellation) for the two subcarriers, or an inversion may be achieved by using two different BPSK modulation schemes, or an inversion may be applied to a modulated subcarrier, such as by shifting the phase by 180 degrees or performing a polarity inversion. In other examples, direct QPSK modulation may be used for the first subcarrier and a conjugated QPSK modulation scheme may be used for the second subcarrier.

In some examples, the radio-frequency signal may comprise $2N_{SD}$ subcarriers, in which subcarriers 0 to $N_{SD}-1$ have no phase-transformation applied thereto and subcarriers $N_{SD}$ to $2N_{SD}-1$ may optionally each have a phase-transformation applied thereto. $N_{SD}$ here indicates the Number of Data Subcarriers in half the resource unit (RU) containing the signal or, more generally, in half of the available data-carrying subcarriers. A $0^{th}$ subcarrier may encode a 0th set of one or more bits (the number depending on the type of modulation), a $1^{st}$ subcarrier may encode a $1^{st}$ set of one or more bits, and so on until the $N_{SD}-1$ subcarrier that encodes an $N_{SD}-1^{th}$ set of one or more bits. The $N_{SD}$ subcarrier can also encode the $0^{th}$ set of one or more bits, and the $N_{SD}+1$ subcarrier can also encode the $1^{st}$ set of bits and so on until the $2N_{SD}-1$ subcarrier that can encode the $N_{SD}-1^{th}$ set of bits. Hence, in some examples, the receiving circuitry 310 is configured to receive a radio-frequency signal comprising $2N_{SD}$ subcarriers, and the first and second subcarriers encoding the same bit sequence (also referred to as a first bit sequence) are separated by $N_{SD}$ subcarriers. Optionally, a phase-transformation may have been applied to one of the first and second subcarriers (e.g. to the second subcarrier), as shown in FIG. 4.

In some embodiments, the radio-frequency signal received by the receiving circuitry 310 may comprise the first and second subcarriers and may further comprise a third subcarrier and a fourth subcarrier both encoding another bit sequence and also separated by $N_{SD}$ subcarriers.

In accordance with the scheme in FIG. 4, the original sequence of N-bits is used to redundantly encode two subcarriers with the same information but with one subcarrier being a phase-transformation of the other. The sequence of N-bits may correspond to some or all of any suitable bit-stream to be transmitted, and N may be any integer value. It may equal the modulation order (i.e. the number of bits per constellation point—e.g. two bits in the example of QPSK) multiplied by the number of OFDM symbols over which the message is carried. As already noted, the message may include further bits, in addition to these N bits, that are encoded on other subcarriers of the OFDM symbol.

Depending on whether BPSK, QPSK or 16QAM is used, groups of one, two or four bits may be mapped onto respective constellation points. Within one symbol period, $N_{SD}$ different constellation points are mapped onto $N_{SD}$ subcarrier symbols over $N_{SD}$ successive frequencies in a first half of the frequency band. The same bits (or constellation points), with or without transformation, are mapped on the next $N_{SD}$ subcarrier symbols in the second half of the frequency band. The $2 \times N_{SD}$ subcarrier symbols transmitted in the same symbol period form one OFDM symbol or Resource Unit symbol. There could be more than one OFDM (or RU) symbol transmitted one after the other in time. According to 802.11 (WiFi™) standards, successive bits of a message (e.g. a data packet) that spans multiple symbols are encoded first across the subcarriers of an OFDM (or RU) symbol (i.e. along the frequency axis) and then across the multiple OFDM symbols. It would of course be possible, in other embodiments, to fill the bits in the time direction first.

In the case of BPSK modulation, a phase-transformation may be applied such that one of the first and second subcarriers received by the receiver apparatus 300 is inverted with respect to the other. In the case of QPSK modulation, a phase-transformation may be applied such that one of the first and second subcarriers received by the receiver apparatus 300 encodes a conjugated version with respect to the other. In the case of 16QAM, a phase-transformation may be applied such that one of the first and second subcarriers received by the receiver apparatus 300 encodes a same bit sequence with a different bit ordering.

Operations of the receiver apparatus 300 for decoding subcarriers modulated using BPSK, QPSK and 16QAM will now be discussed in turn.

BPSK

In some embodiments, the radio-frequency signal received by the receiving circuitry 310 comprises the first subcarrier and the second subcarrier that have been modulated using Binary Phase Shift Keying (BPSK). The first subcarrier comprises the first subcarrier symbols which each encode a single bit and the second subcarrier comprises the second subcarrier symbols which each encode a single bit.

The soft-output MIMO decoder circuitry calculates a respective LLR for each of the first subcarrier symbols and thus generates the first output sequence comprising a sequence of LLRs. Similarly, the soft-output MIMO decoder circuitry calculates a respective LLR for each of the second subcarrier symbols and thus generates the second output sequence comprising a sequence of LLRs.

In some embodiments, the first subcarrier and the second subcarrier have been modulated using a same BPSK scheme. Therefore, for the first subcarrier m, the signal received by the receiver apparatus 300 can be represented as: $X_m = (T(H_m) \times d_m) + W_m$, where T is an optional phase-transformation that may or may not have been applied at a transmitter side, $H_m$ is the channel response matrix for the first subcarrier, d m is the modulated signal and $W_m$ is the noise component. Similarly, for the second subcarrier n, the signal received by the receiver apparatus 300 can be represented as: $X_n = (T(H_n) \times d_n) + W_n$, where $d_n = d_m$, and again T is an optional phase-transformation that may or may not have been applied at a transmitter side.

In some embodiments, no phase-transformation is applied for the first subcarrier m and the second subcarrier n. Therefore, the combiner circuitry can combine the first output sequence (which comprises the LLRs calculated for the first subcarrier symbols) and the second output sequence (which comprises the LLRs calculated for the second subcarrier symbols) by adding a respective LLR in the first output sequence to a respective LLR in the second output sequence. Consequently, a combined LLR for a bit of the bit sequence can be represented as: $LLR_{comb} = LLR_m + LLR_n$.

However, in some examples a phase-transformation can be applied at the transmitter side so that one of the first subcarrier and the second subcarrier is inverted with respect to the other. Therefore, for a given OFDM symbol period, the signals $d_m$ and $d_n$ have the relationship: $d_m = -d_n$. Therefore, in some embodiments the soft-output MIMO decoder circuitry 320 generates the first output sequence and the second output sequence, and combines the first output sequence and the second output sequence by subtracting a respective LLR in one of the output sequences (e.g. the second output sequence for the second subcarrier) from a respective LLR in the other output sequence (e.g. the first output sequence for the first subcarrier). Therefore, the combiner circuitry 330 obtains a combined output sequence comprising a combined LLR for each bit of the bit sequence, in which each combined LLR is obtained according to the following calculation $LLR_{comb} = LLR_m - LLR_n$ when the second subcarrier n has been inverted with respect to the first subcarrier m. Similarly, when the first subcarrier m has been inverted with respect to the second subcarrier n, each combined LLR can be obtained according to the following calculation: $LLR_{comb} = LLR_n - LLR_m$.

However, in some embodiments for which one of the first subcarrier and the second subcarrier is inverted with respect to the other subcarrier, rather than subtracting LLR values as set forth above, the soft-output MIMO decoder circuitry 320 may instead decode the subcarrier symbols of the inverted subcarrier using an inverted channel response matrix H (e.g. $-H_n$ or $-H_m$). Therefore, rather than requiring knowledge that one of the subcarriers is inverted with respect to the other and then performing LLR subtraction instead of LLR addition, the receiver apparatus can instead use an inverted channel response matrix for the inverted subcarrier and perform LLR addition. Moreover, rather than compensating for inversion of the one of the first and second subcarriers by performing LLR subtraction, the receiver apparatus 300 can receive an inverted channel response matrix (e.g. $-H_n$) and perform LLR addition. For example, $H_m$ and $X_m$ may be used by the receiver apparatus 300 such that the first output sequence is generated for the first subcarrier m, and $-H_n$ and $X_n$ may be used by the receiver apparatus 300 such that the second output sequence is generated for the second subcarrier n, and therefore LLRs can be added as though the signals $d_n$ and $d_m$ are not inverted.

Consequently, the soft-output MIMO decoder circuitry 320 can calculate the LLR values for one of the subcarriers in dependence upon an inverted MIMO channel matrix for that subcarrier whilst calculating the LLR values for the other subcarrier (which has not been inverted at the transmitter) in dependence upon a MIMO channel matrix for that other subcarrier. The combiner circuitry can thus add the respective LLRs calculated for the first subcarrier with the respective LLRs calculated for the second subcarrier to obtain the combined LLRs.

As explained previously, in some examples the received radio-frequency signal may comprise $2N_{SD}$ subcarriers, indexed from zero to $2N_{SD}-1$. In some embodiments, in the case where $N_{SD}$ is an odd number, subcarriers $N_{SD}+K$ may be inverted at the transmitter-side for every even value of K=0, 2, . . . , $N_{SD}-1$ and transmitted with no inversion for every odd value of K=1, 3, . . . , $N_{SD}-2$. In the case where $N_{SD}$ is an even number, subcarriers $N_{SD}+K$ may be inverted for every odd value of K=1, 3, . . . , $N_{SD}-2$ and transmitted with no inversion for every even value of K=0, 2, . . . , $N_{SD}-1$. Hence more generally, the receiver apparatus 300 can receive a radio-frequency signal comprising $2N_{SD}$ subcarriers, and the first subcarrier and the second subcarrier may be separated by $N_{SD}$ subcarriers and one may be inverted with respect to the other.

Figure 5A:
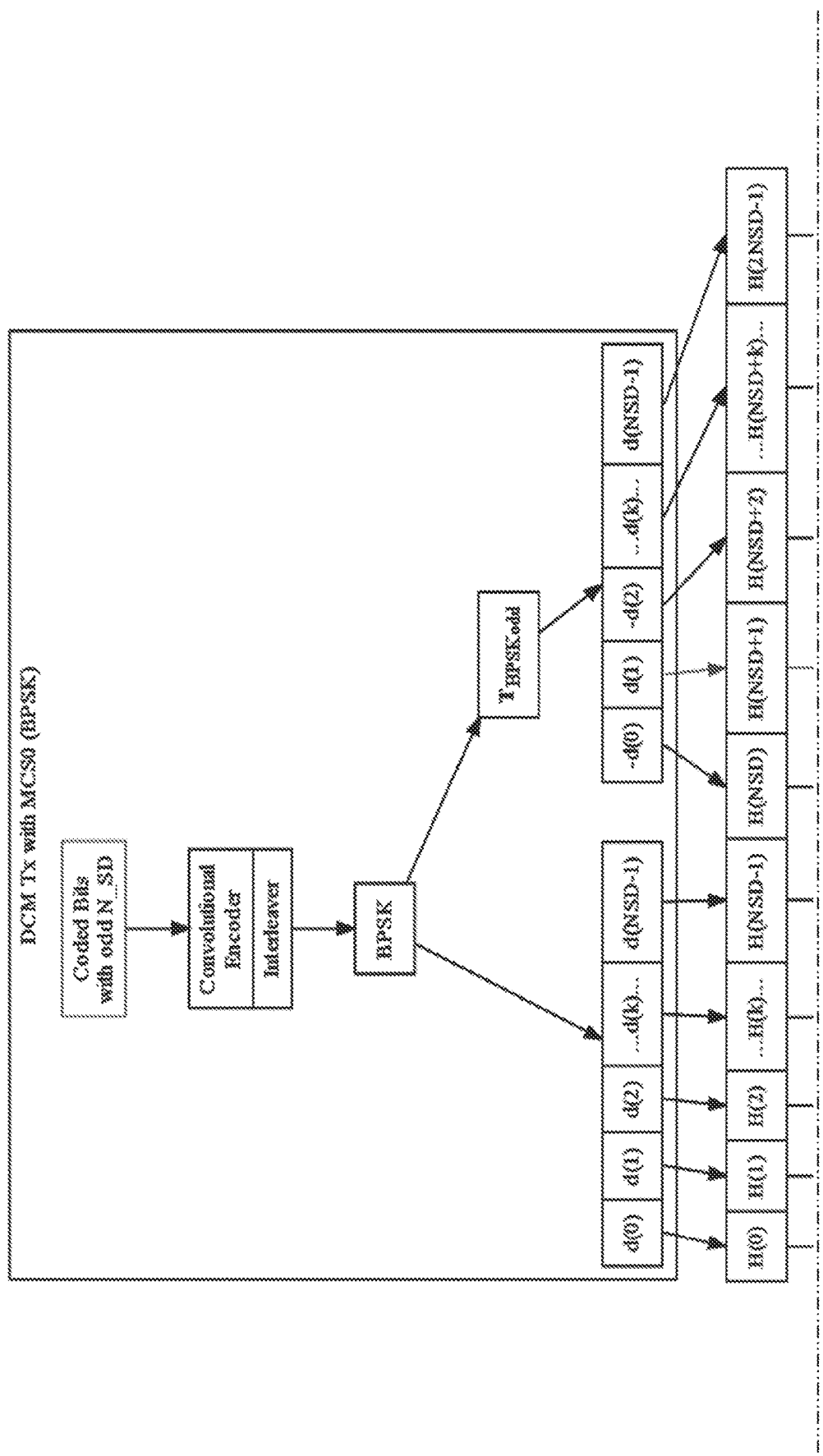
FIG. 5A and FIG. 5B are partial views that, when taken together, form a schematic flowchart illustrating an example of performing LLR combining for subcarriers modulated using Binary Phase Shift Keying (BPSK)
Figure 5B:
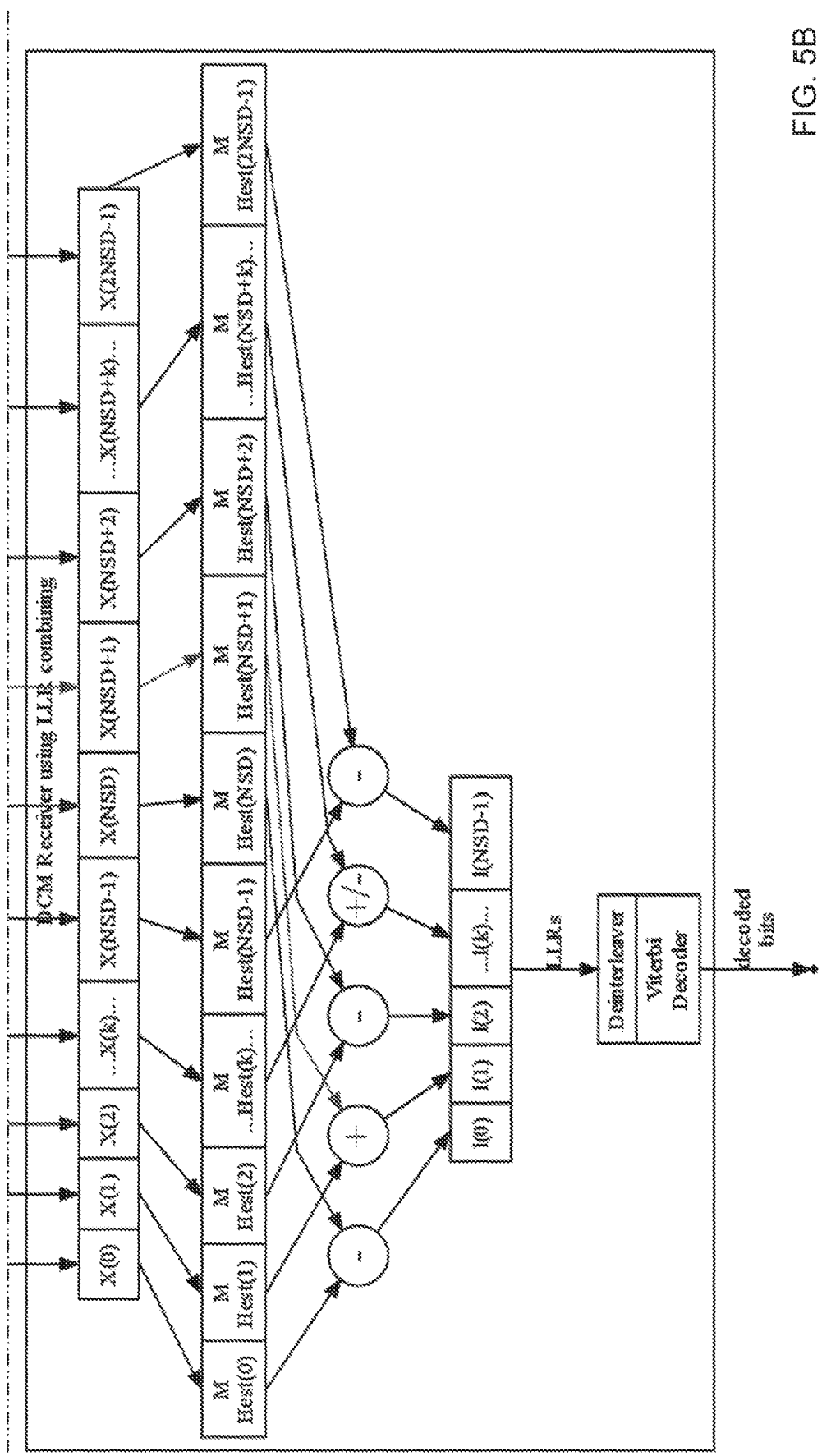

FIG. 5 (which consists of FIGS. 5A and 5B) schematically illustrates an example in which subcarriers with BPSK modulation are received, for an odd number of subcarriers $N_{SD}$, with even-indexed subcarriers being inverted, and LLR combining is performed using LLR addition for pairs of non-inverted subcarriers and LLR subtraction is performed for each pair of subcarriers for which inversion has been performed on one of the subcarriers.

Combined LLR (shown as I(0)) is obtained by the combiner circuitry 330 subtracting an LLR output by the soft-output MIMO decoder circuitry for a signal X(0) received for a subcarrier symbol of a first subcarrier (subcarrier 0) and an LLR output by the soft-output MIMO decoder circuitry for a signal $X(N_{SD})$ received for a subcarrier symbol of a second subcarrier (subcarrier $N_{SD}$). As shown in FIG. 5, the subcarrier 0 and subcarrier $N_{SD}$ encode the signal d(0) and $-d(0)$, respectively, and therefore LLR subtraction is performed to subtract the LLR for $-d(0)$ from the LLR for d(0). Also shown in FIG. 5, the subcarrier 1 and subcarrier $N_{SD}+1$ both encode the signal d(1) (with neither having been inverted) and therefore LLR addition is performed to add the LLRs.

QPSK

In some embodiments, the radio-frequency signal received by the receiving circuitry 310 comprises the first subcarrier and the second subcarrier that have been modulated using Quaternary Phase Shift Keying (QPSK). The first subcarrier comprises the first subcarrier symbols which each encode two bits and the second subcarrier comprises the second subcarrier symbols which each encode two bits. Moreover, using a QPSK constellation, two bits can be mapped into four possible subcarrier phases. Therefore, a subcarrier symbol of a subcarrier modulated using QPSK can be decoded to obtain two bits referred to herein as bit 0 (or a real-axis bit) and bit 1 (or an imaginary-axis bit).

The soft-output MIMO decoder circuitry 320 can thus calculate two LLRs for each of the first subcarrier symbols and also calculate two LLRs for each of the second subcarrier symbols and generate the first output sequence and the second output sequence. A first LLR calculated for the first subcarrier symbol and a first LLR calculated for the second subcarrier symbol correspond to a same respective bit of the bit sequence, and similarly a second LLR calculated for the first subcarrier symbol and a second LLR calculated for the second subcarrier symbol correspond to another respective bit of the bit sequence.

LLR combining can be performed by the combining circuitry 330 to combine the first output sequence and the second output sequence and thereby obtain a combined output sequence comprising a combined LLR for each bit of the bit sequence transmitted using the first and second subcarriers. In particular, in the case of QPSK modulation the combining circuitry 330 performs LLR combining for a first subcarrier symbol and a second subcarrier symbol transmitted in the same OFDM symbol period (and thus encoding the same two bits with frequency diversity) by: adding a respective LLR calculated for the first subcarrier symbol with a respective LLR calculated for the second subcarrier symbol to obtain a first combined LLR; and subtracting another respective LLR calculated for the second subcarrier symbol from another respective log-likelihood ratio calculated for the first subcarrier symbol to obtain a second combined log-likelihood ratio. Specifically, LLR combining can comprise performing an addition for the two LLRs relating to the so-called real-axis bit and performing a subtraction for the two LLRs relating to the so-called imaginary-axis bit. This subtraction can be performed for the two LLRs relating to the so-called imaginary-axis bit to account for the second subcarrier encoding a conjugated version with respect to the first subcarrier (due to a phase-transformation applied for the second subcarrier at a transmitter-side). Hence, the combiner circuitry 330 can obtain a combined output sequence comprising a combined LLR for each bit of the bit sequence.

Therefore, for each symbol, a first combined LLR can be obtained according to the following calculation $LLR_{comb,0}=LLR_{m,0}+LLR_{n,0}$ (for bit 0) and a second combined LLR is obtained according to the following calculation $LLR_{comb,1}=LLR_{m,1}-LLR_{n,1}$ (for bit 1).

However, rather than performing an LLR addition to obtain the first combined LLR and performing an LLR subtraction to obtained the second combined LLR (as shown above), in some embodiments the soft-output MIMO decoder uses a conjugate of a MIMO channel matrix and a conjugate of each received symbol for a subcarrier for soft-decoding the symbols of that subcarrier. Therefore, rather than performing LLR subtraction with respect to the imaginary-axis bit, the receiver apparatus can compensate for the inversion of the subcarrier relative to the other by using the conjugate of the MIMO channel matrix (e.g. conj($H_n$)) and the conjugate of the received signal (e.g. conj($X_n$)) for the subcarrier and the combiner circuitry 330 performs LLR addition. Therefore, LLR addition can be performed to obtain the combined LLR for the so-called real-axis bit and LLR addition can also be performed to obtain the combined LLR for the so-called imaginary-axis bit.

Therefore, in some embodiments the soft-output MIMO decoder circuitry can be configured to: calculate, for each of the subcarrier symbols of the second subcarrier, two respective log-likelihood ratios in dependence upon a conjugated MIMO channel matrix and a conjugated received symbol for the second subcarrier; and calculate, for each of the subcarrier symbols of the first subcarrier, two respective log-likelihood ratios in dependence upon a (non-conjugated) MIMO channel matrix for the first subcarrier. More generally, H and X used for one subcarrier, while conj(H) and conj(X) are used for the other subcarrier.

As explained previously, in some examples the received radio-frequency signal may comprise $2N_{SD}$ subcarriers. A bit sequence can be redundantly encoded by a first subcarrier in a first half of the $2N_{SD}$ subcarriers ($0^{th}$ subcarrier to $N_{SD}-1$) and a second subcarrier in a second half of the $2N_{SD}$ subcarriers ($N_{SD}$ to $2N_{SD}-1$) can also encode the same bit sequence. For example, the first subcarrier may be the $0^{th}+P$ subcarrier and the second subcarrier may be $N_{SD}+P$ subcarrier (where P may be any value between 0 and $N_{SD}-1$). At a transmitter side a phase-transformation may be applied for each of the subcarriers in the second half of the $2N_{SD}$ subcarriers so that the second subcarrier is a conjugate of the first subcarrier. In particular, a first QPSK scheme may be used to modulate the first subcarrier and a second QPSK scheme different from the first QPSK scheme may be used to modulate the second subcarrier. Specifically, the second QPSK scheme can differ from the first QPSK scheme by using a conjugate of the constellation (i.e. an inversion of the imaginary part).

Consequently, the receiver apparatus 300 in accordance with the invention can perform LLR subtraction for obtaining a combined LLR relating to an imaginary-axis bit, or the soft-output MIMO decoder circuitry 320 can perform soft-decoding using a conjugate of a MIMO channel matrix and of the received symbol and then perform LLR addition for obtaining the combined LLR relating to the imaginary-bit.

Figure 6A:
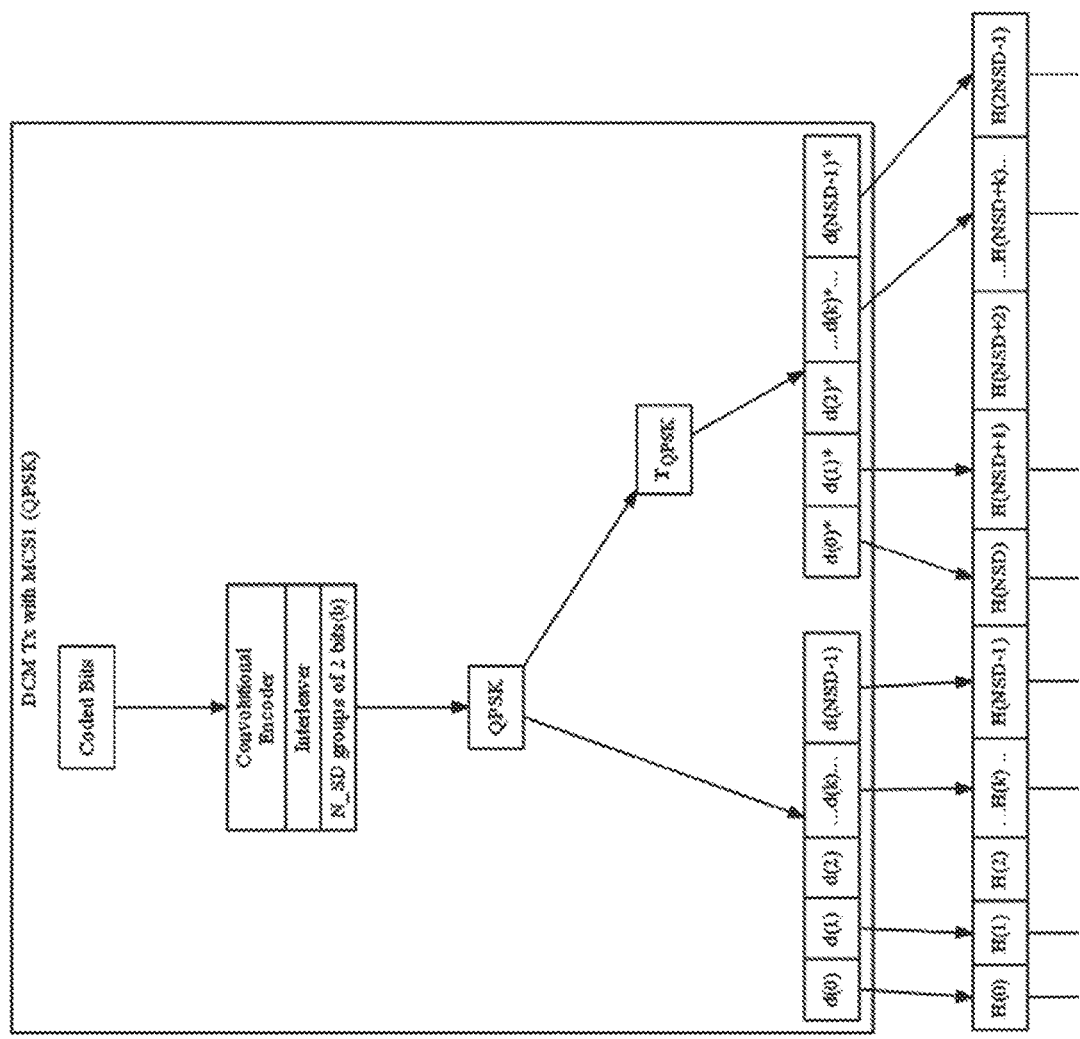
FIG. 6A and FIG. 6B are partial views that, when taken together, form a schematic flowchart illustrating an example of performing LLR combining for subcarriers modulated using Quaternary Phase Shift Keying (QPSK)
Figure 6B:
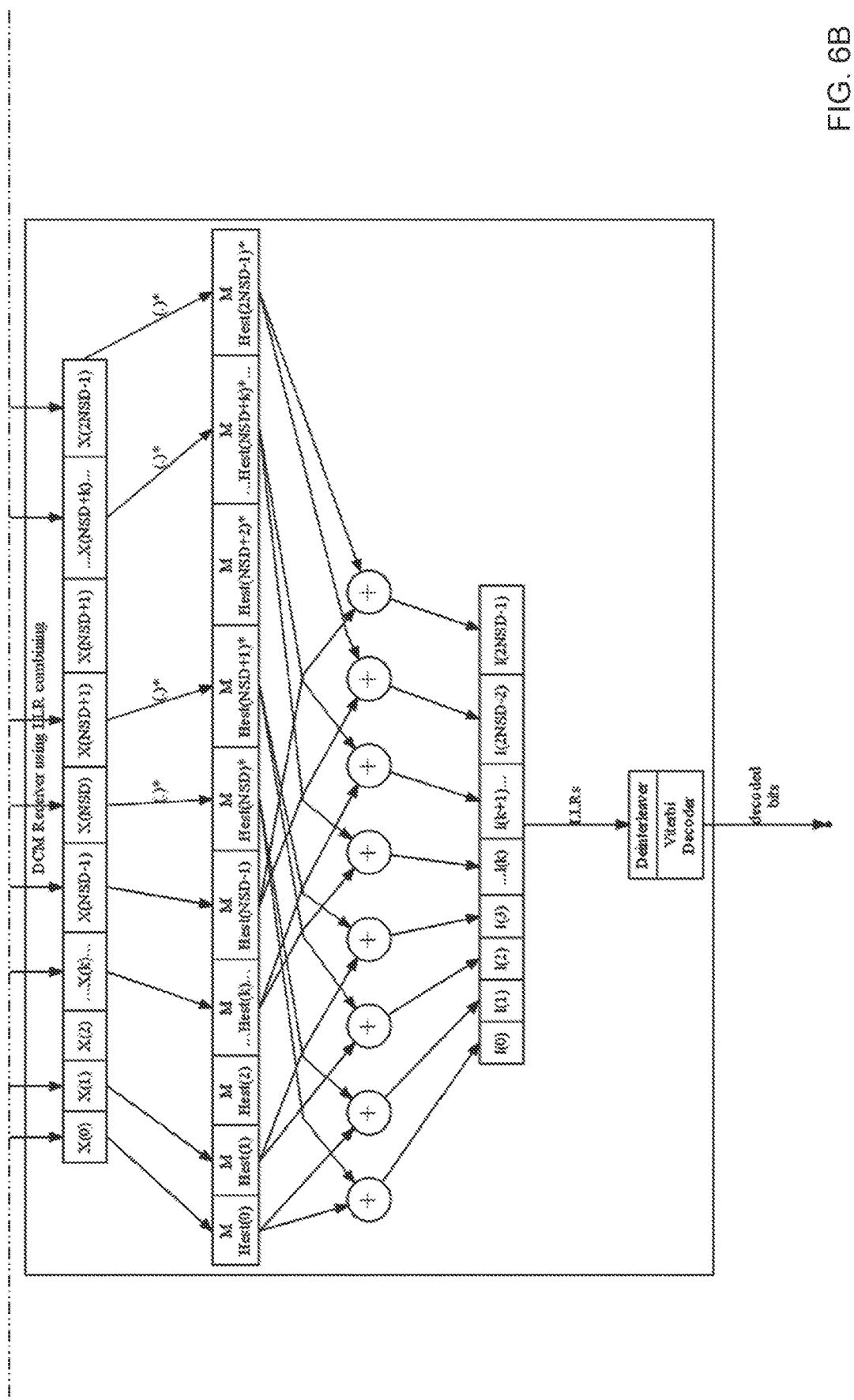

FIG. 6 (which consists of FIGS. 6A and 6B) schematically illustrates an example in which subcarriers with QPSK modulation are received and the second half of the subcarriers, $N_{SD}$ to $2N_{SD}-1$, are processed by the soft-output MIMO decoder circuitry 320 using the conjugate of the MIMO channel matrix and the conjugate of their received symbols (shown as $H_{est}(\ )^*$ and $(\ )^*$ in FIG. 6), and LLR combining is performed using LLR addition.

16QAM

In some embodiments, the radio-frequency signal received by the receiving circuitry 310 comprises the first subcarrier and the second subcarrier that have been modulated using 16-Quadrature Amplitude Modulation (QAM). The first subcarrier comprises the first subcarrier symbols which each encode four bits and the second subcarrier comprises the second subcarrier symbols which each encode four bits.

However, the first subcarrier and second subcarrier can be modulated so as to have a different bit ordering for the four bits encoded by each subcarrier symbol. The soft-output MIMO decoder circuitry 320 can thus calculate four LLRs for each of the first subcarrier symbols and also calculate four LLRs for each of the second subcarrier symbols and generate the first output sequence and the second output sequence.

LLR combining can be performed by the combining circuitry 330 to combine the first output sequence and the second output sequence and thereby obtain a combined output sequence comprising a combined LLR for each bit of the N-bit sequence transmitted using the first and second subcarriers. In particular, in the case of 16QAM modulation, to account for the different bit ordering, the combining circuitry performs LLR combining for a first subcarrier symbol and a second subcarrier symbol of the same OFDM symbol—i.e. sharing a same symbol period (and thus encoding the same two bits with frequency diversity) by, for each J=0, 4, 8, . . . , N−4:

adding a respective log-likelihood ratio corresponding to a sequence position J in the first output sequence to a respective log-likelihood ratio corresponding to a sequence position J+1 in the second output sequence to obtain a first combined log-likelihood ratio;

adding a respective log-likelihood ratio corresponding to a sequence position J+1 in the first output sequence to a respective log-likelihood ratio corresponding to a sequence position J in the second output sequence to obtain a second combined log-likelihood ratio;

adding a respective log-likelihood ratio corresponding to a sequence position J+2 in the first output sequence to a respective log-likelihood ratio corresponding to a sequence position J+3 in the second output sequence to obtain a third combined log-likelihood ratio; and adding a respective log-likelihood ratio corresponding to a sequence position J+3 in the first output sequence to a respective log-likelihood ratio corresponding to a sequence position J+2 in the second output sequence to obtain a fourth combined log-likelihood ratio.

Hence, for a first subcarrier symbol and a second subcarrier symbol relating to a same 4-bits of the transmitted bit sequence, LLRs can be combined according to the following calculations, where m is refers to the first subcarrier and n refers to the second subcarrier:

$$LLR_{comb,0}=LLR_{m,0}+LLR_{n,1};$$

$$LLR_{comb,1}=LLR_{m,1}+LLR_{n,0};$$

$$LLR_{comb,2}=LLR_{m,2}+LLR_{n,3};$$

$$LLR_{comb,3}=LLR_{m,3}+LLR_{n,2}.$$

The above calculations can thus be repeated to obtain the combined output sequence comprising the combined LLRs for the bit sequence transmitted by the first and second subcarriers. Hence, the combiner circuitry 330 can obtain a combined output sequence comprising a combined LLR for each bit of the bit sequence.

Figure 7A:
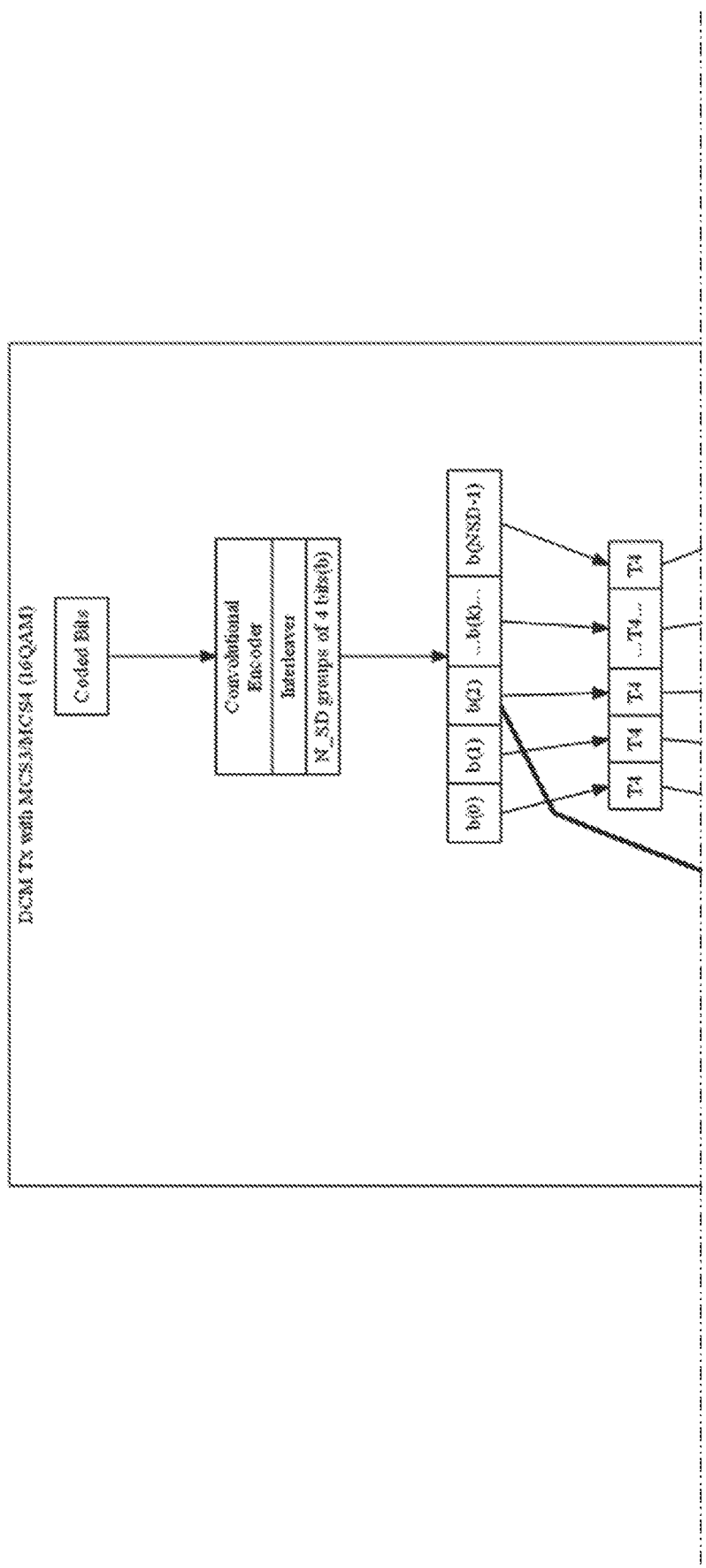
FIG. 7A, FIG. 7B, and FIG. 7C are partial views that, when taken together, form a schematic flowchart illustrating an example of performing LLR combining for subcarriers modulated using 16Quadrature Amplitude Modulation (QAM)
Figure 7B:
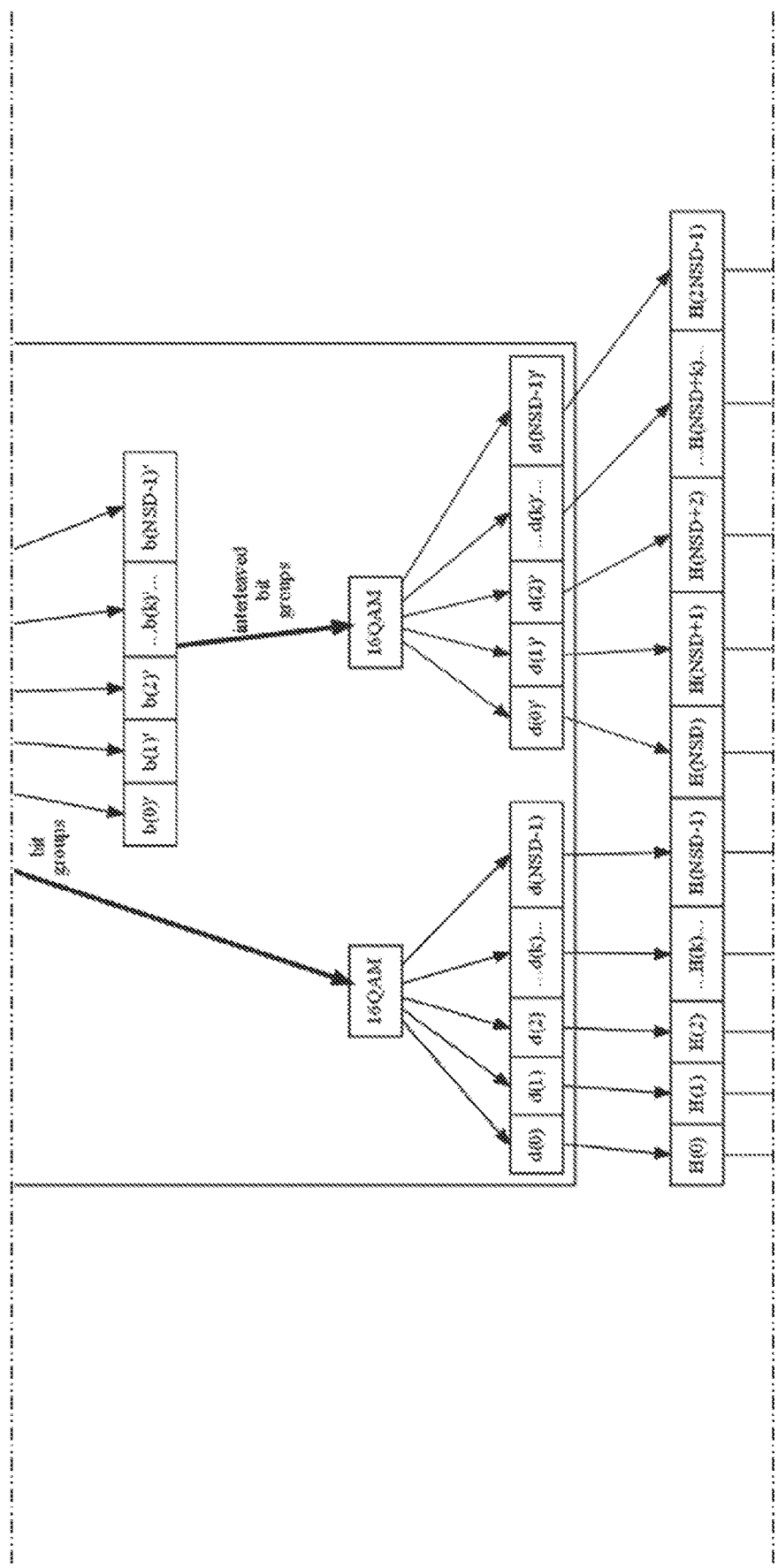
Figure 7C:
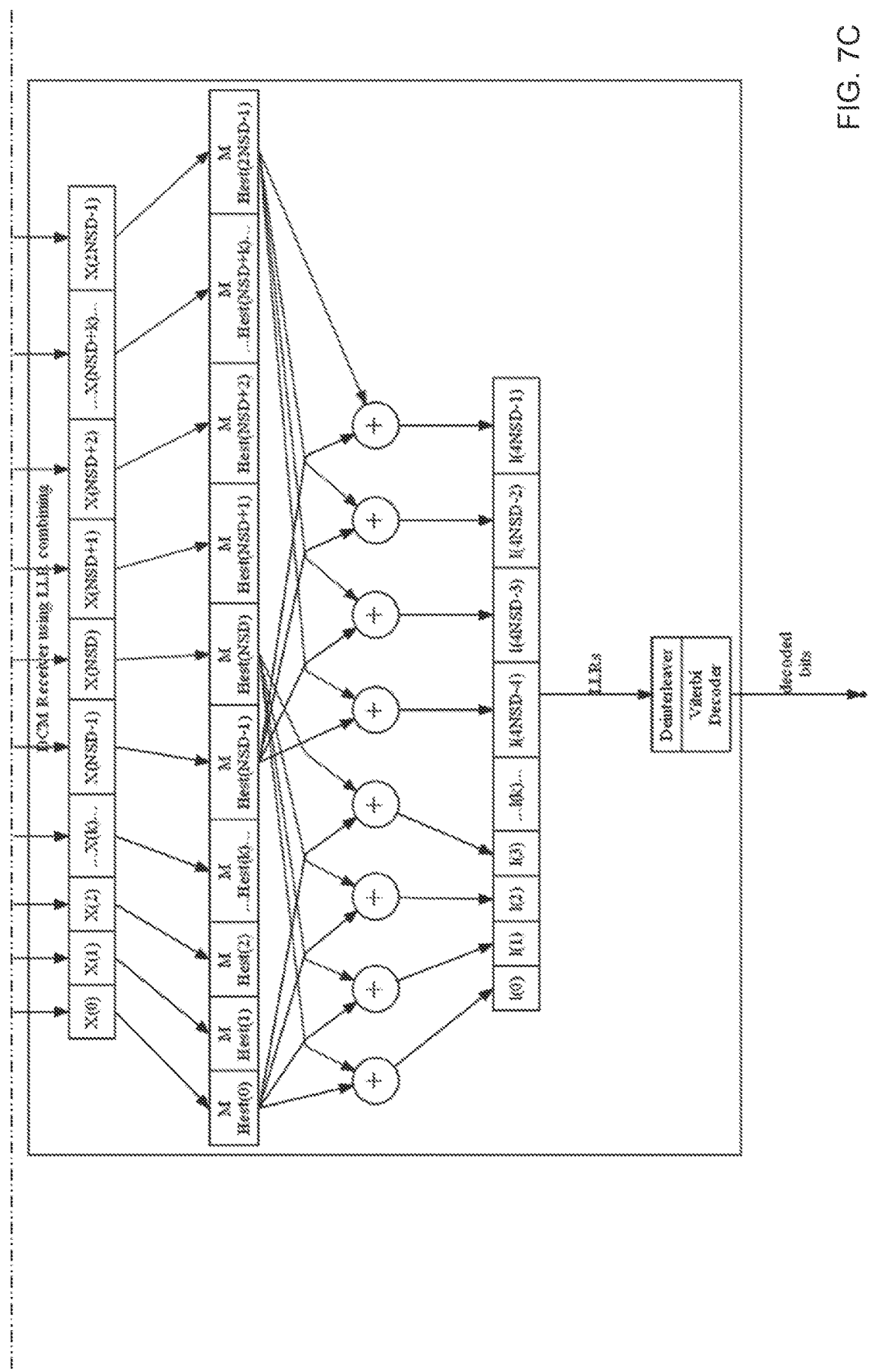

FIG. 7 (which consists of FIGS. 7A, 7B and 7C) schematically illustrates an example in which subcarriers modulated using 16QAM are received and LLR addition is performed in accordance with the above calculations.

Figure 8:
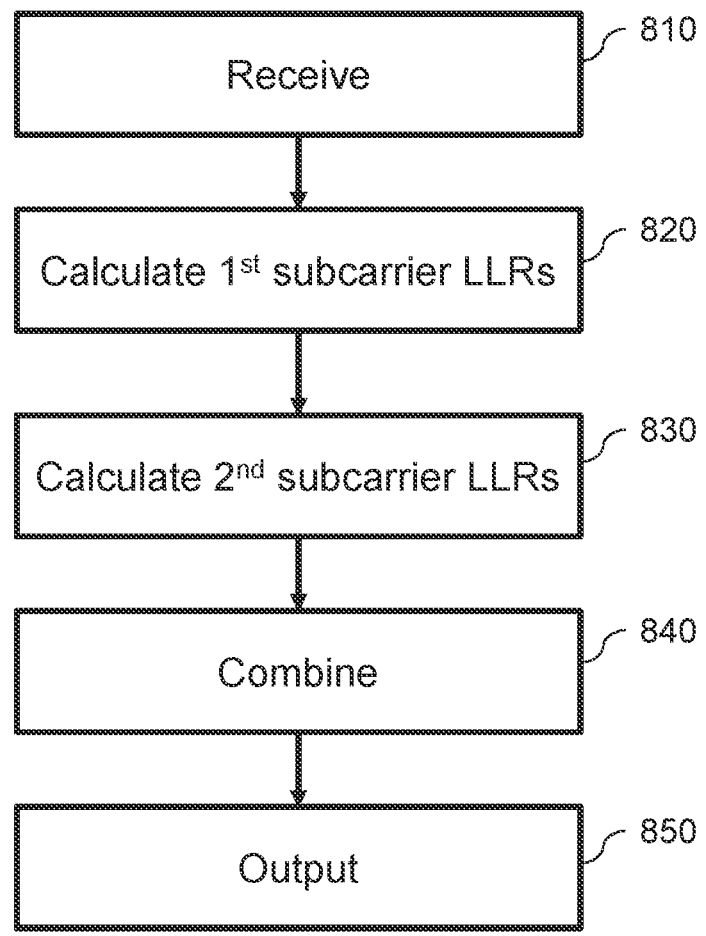
FIG. 8 is a schematic flowchart illustrating a method in accordance with embodiments of the present invention.

FIG. 8 is a schematic flowchart illustrating a method in accordance with embodiments of the present invention. The method comprises:

receiving (at a step 810) a radio-frequency signal (e.g. an OFDM signal) comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective symbol period (e.g. OFDM symbol period), and wherein the first and second subcarriers have a same type of modulation and different subcarrier frequencies;

calculating (at a step 820) one or more respective log-likelihood ratios for each of the first subcarrier symbols and determining a first output sequence comprising the respective log-likelihood ratios calculated for the first subcarrier symbols;

calculating (at a step 830) one or more respective log-likelihood ratios for each of the second subcarrier symbols and determining a second output sequence comprising the respective log-likelihood ratios calculated for the second subcarrier symbols; and combining (at a step 840) the first output sequence and the second output sequence to determine a combined output sequence comprising a sequence of respective combined log-likelihood ratios for each bit of the bit sequence, wherein combining the first output sequence and the second output sequence comprises adding or subtracting a respective log-likelihood ratio calculated for each first subcarrier symbol with a respective log-likelihood ratio calculated for the respective second subcarrier symbol to obtain the combined log-likelihood ratio for the respective bit of the bit sequence.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A receiver apparatus comprising:
   receiving circuitry configured to receive a radio-frequency signal comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective symbol period, and wherein the first and second subcarriers have a same type of modulation and different subcarrier frequencies; and
   soft-output decoder logic and combiner logic, each comprising respective circuitry or comprising respective software instructions stored in a memory of the receiver apparatus for execution by a processor of the receiver apparatus,
   wherein the soft-output decoder logic is configured to:
      calculate one or more respective log-likelihood ratios for each of the first subcarrier symbols and generate a first output sequence comprising the respective log-likelihood ratios calculated for the first subcarrier symbols; and
      calculate one or more respective log-likelihood ratios for each of the second subcarrier symbols and generate a second output sequence comprising the respective log-likelihood ratios calculated for the second subcarrier symbols;
   wherein the combiner logic is configured to:
      combine the first output sequence and the second output sequence to obtain a combined output sequence, wherein the combiner logic is configured to add or subtract a respective log-likelihood ratio calculated for each first subcarrier symbol with a respective log-likelihood ratio calculated for the respective second subcarrier symbol to obtain a combined log-likelihood ratio for a respective bit of the bit sequence; and
      output the combined output sequence comprising a respective combined log-likelihood ratio for each bit of the bit sequence;
   wherein the first subcarrier and the second subcarrier have a phase-based type of modulation and a phase-transform operation has been applied so that the second subcarrier is phase-transformed with respect to the first subcarrier; and
   wherein the combiner logic is configured to subtract at least one respective log-likelihood ratio calculated for each second subcarrier symbol from at least one respective log-likelihood ratio calculated for the respective first subcarrier symbol to obtain at least one respective combined log-likelihood ratio.

2. The receiver apparatus of claim 1, wherein the first subcarrier and the second subcarrier are both modulated using Binary Phase Shift Keying (BPSK) and the second subcarrier is inverted with respect to the first subcarrier, and wherein the combiner logic is configured to subtract the respective log-likelihood ratio calculated for each second subcarrier symbol from the respective log-likelihood ratio calculated for the respective first subcarrier symbol to obtain the combined log-likelihood ratio.

3. The receiver apparatus of claim 1, wherein the first subcarrier and the second subcarrier are both modulated using Quadrature Phase Shift Keying (QPSK), and wherein the soft-output decoder logic is configured to calculate two respective log-likelihood ratios for each of the first subcarrier symbols and to calculate two respective log-likelihood ratios for each of the second subcarrier symbols, wherein for the respective first subcarrier symbol and second subcarrier symbol corresponding to each symbol period, the combiner logic is configured to:
   add a first respective log-likelihood ratio calculated for the first subcarrier symbol to a first respective log-likelihood ratio calculated for the second subcarrier symbol to obtain a first combined log-likelihood ratio; and
   subtract a second respective log-likelihood ratio calculated for the second subcarrier symbol from a second respective log-likelihood ratio calculated for the first subcarrier symbol to obtain a second combined log-likelihood ratio.

4. The receiver apparatus of claim 3, wherein the first respective log-likelihood ratio calculated for the first subcarrier symbol and the first respective log-likelihood ratio calculated for the second subcarrier symbol correspond to one respective bit of the bit sequence, and wherein the second respective log-likelihood ratio calculated for the first subcarrier symbol and the second respective log-likelihood ratio calculated for the second subcarrier symbol correspond to another respective bit of the bit sequence.

5. The receiver apparatus of claim 1, wherein the soft-output decoder logic comprises Multiple Input Multiple Output (MIMO) decoder logic.

6. A method comprising:

receiving data representative of a received radio signal comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective subcarrier symbol period, and wherein the first and second subcarriers have a same type of modulation and different subcarrier frequencies;

calculating one or more respective log-likelihood ratios for each of the first subcarrier symbols and determining a first output sequence comprising the respective log-likelihood ratios calculated for the first subcarrier symbols;

calculating one or more respective log-likelihood ratios for each of the second subcarrier symbols and determining a second output sequence comprising the respective log-likelihood ratios calculated for the second subcarrier symbols; and combining the first output sequence and the second output sequence to determine a combined output sequence comprising a respective combined log-likelihood ratio for each bit of the bit sequence, wherein combining the first output sequence and the second output sequence comprises adding or subtracting a respective log-likelihood ratio calculated for each first subcarrier symbol with a respective log-likelihood ratio calculated for the respective second subcarrier symbol to obtain a combined log-likelihood ratio for a respective bit of the bit sequence;

wherein:

(A) the first subcarrier and the second subcarrier have a phase-based type of modulation and a phase-transform operation has been applied so that the second subcarrier is phase-transformed with respect to the first subcarrier; and the method comprises subtracting at least one respective log-likelihood ratio calculated for each second subcarrier symbol from at least one respective log-likelihood ratio calculated for the respective first subcarrier symbol to obtain at least one respective combined log-likelihood ratio;

or (B) the first subcarrier and the second subcarrier have a phase-based type of modulation and a phase-transform operation has been applied so that the second subcarrier is phase-transformed with respect to the first subcarrier; and the method comprises:

calculating at least one respective log-likelihood ratio for each of the second subcarrier symbols in dependence upon a transformed channel matrix for the second subcarrier, and adding each respective log-likelihood ratio calculated for the second subcarrier symbol to a respective log-likelihood ratio calculated for the respective first subcarrier symbol;

or (C) the first subcarrier and the second subcarrier are both modulated using 16-Quadrature Amplitude Modulation (QAM), the method comprises:

calculating, for each of the first subcarrier symbols, four respective log-likelihood ratios and generate the first output sequence comprising the respective log-likelihood ratios calculated for the first subcarrier symbols; and calculating, for each of the second subcarrier symbols, four respective log-likelihood and generate the second output sequence comprising the respective log-likelihood ratios calculated for the second subcarrier symbols, and the method comprises, for each integer J that is a multiple of four and less the length of the bit sequence:

adding a respective log-likelihood ratio corresponding to a sequence position J in the first output sequence to a respective log-likelihood ratio corresponding to a sequence position J+1 in the second output sequence to obtain a first combined log-likelihood ratio;

adding a respective log-likelihood ratio corresponding to a sequence position J+1 in the first output sequence to a respective log-likelihood ratio corresponding to a sequence position J in the second output sequence to obtain a second combined log-likelihood ratio;

adding a respective log-likelihood ratio corresponding to a sequence position J+2 in the first output sequence to a respective log-likelihood ratio corresponding to a sequence position J+3 in the second output sequence to obtain a third combined log-likelihood ratio; and adding a respective log-likelihood ratio corresponding to a sequence position J+3 in the first output sequence to a respective log-likelihood ratio corresponding to a sequence position J+2 in the second output sequence to obtain a fourth combined log-likelihood ratio.

7. The method of claim 6, wherein the radio-frequency signal is an 802.11ax dual carrier modulation (DCM) signal.

8. A non-transitory computer-readable medium storing instructions which, when executed by one or more processors of a receiving apparatus, cause the receiving apparatus to perform the method of claim 6.

9. A receiver apparatus comprising:

receiving circuitry configured to receive a radio-frequency signal comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective symbol period, and wherein the first and second subcarriers have a same type of modulation and different subcarrier frequencies; and soft-output decoder logic and combiner logic, each comprising respective circuitry or comprising respective software instructions stored in a memory of the receiver apparatus for execution by a processor of the receiver apparatus, wherein the soft-output decoder logic is configured to:
calculate one or more respective log-likelihood ratios for each of the first subcarrier symbols and generate a first output sequence comprising the respective log-likelihood ratios calculated for the first subcarrier symbols;
calculate one or more respective log-likelihood ratios for each of the second subcarrier symbols and generate a second output sequence comprising the respective log-likelihood ratios calculated for the second subcarrier symbols; and wherein the combiner logic is configured to:
combine the first output sequence and the second output sequence to obtain a combined output sequence, wherein the combiner logic is configured to add or subtract a respective log-likelihood ratio calculated for each first subcarrier symbol with a respective log-likelihood ratio calculated for the respective second subcarrier symbol to obtain a combined log-likelihood ratio for a respective bit of the bit sequence; and
output the combined output sequence comprising a respective combined log-likelihood ratio for each bit of the bit sequence;

wherein the first subcarrier and the second subcarrier have a phase-based type of modulation and a phase-transform operation has been applied so that the second subcarrier is phase-transformed with respect to the first subcarrier;

wherein the soft-output decoder logic is configured to calculate at least one respective log-likelihood ratio for each of the second subcarrier symbols in dependence upon a transformed channel matrix for the second subcarrier, and wherein the combiner logic is configured to add each respective log-likelihood ratio calculated for the second subcarrier symbol to a respective log-likelihood ratio calculated for the respective first subcarrier symbol.

10. The receiver apparatus of claim 9, wherein the first subcarrier and the second subcarrier are both modulated using Binary Phase Shift Keying (BPSK) and the second subcarrier is inverted with respect to the first subcarrier, wherein the soft-output decoder logic is configured to calculate, for each of the second subcarrier symbols, one or more respective log-likelihood ratios in dependence upon an inverted channel matrix for the second subcarrier and generate the second output sequence comprising the respective log-likelihood ratios calculated for the second subcarrier symbols, and wherein the combiner logic is configured to add the respective log-likelihood ratio calculated for each first subcarrier symbol to the respective log-likelihood ratio calculated for the respective second subcarrier symbol to obtain the respective combined log-likelihood ratio.

11. The receiver apparatus of claim 9, wherein the first subcarrier and the second subcarrier are both modulated using Quadrature Phase Shift Keying (QPSK), and wherein the soft-output decoder logic is configured to:
calculate, for each of the first subcarrier symbols, two respective log-likelihood ratios in dependence upon a channel matrix for the first subcarrier; and
calculate, for each of the second subcarrier symbols, two respective log-likelihood ratios in dependence upon a conjugated channel matrix and a conjugated received symbol for the second subcarrier, and wherein, for the respective first subcarrier symbol and second subcarrier symbol corresponding to each symbol period, the combiner logic is configured to:
add a first log-likelihood ratio calculated for the first subcarrier symbol to a first log-likelihood ratio calculated for the second subcarrier symbol to obtain a first-bit combined log-likelihood ratio; and
add a second log-likelihood ratio calculated for the second subcarrier symbol to a second log-likelihood ratio calculated for the first subcarrier symbol to obtain a second-bit combined log-likelihood ratio.

12. The receiver apparatus of claim 9, wherein the soft-output decoder logic comprises Multiple Input Multiple Output (MIMO) decoder logic.

13. A receiver apparatus comprising:
receiving circuitry configured to receive a radio-frequency signal comprising a first subcarrier comprising first subcarrier symbols and a second subcarrier comprising second subcarrier symbols, wherein the first subcarrier symbols and the second subcarrier symbols both encode a same bit sequence, the bit sequence comprising sets of one or more bits, wherein a respective set of one or more bits is encoded in a respective first subcarrier symbol of the first subcarrier and also in a respective second subcarrier symbol of the second subcarrier, the first subcarrier symbol and second subcarrier symbol occupying a same respective symbol period, and wherein the first and second subcarriers have a same type of modulation and different subcarrier frequencies; and soft-output decoder logic and combiner logic, each comprising respective circuitry or comprising respective software instructions stored in a memory of the receiver apparatus for execution by a processor of the receiver apparatus, wherein the soft-output decoder logic is configured to:
calculate one or more respective log-likelihood ratios for each of the first subcarrier symbols and generate a first output sequence comprising the respective log-likelihood ratios calculated for the first subcarrier symbols; and
calculate one or more respective log-likelihood ratios for each of the second subcarrier symbols and generate a second output sequence comprising the respective log-likelihood ratios calculated for the second subcarrier symbols; and wherein the combiner logic is configured to:
combine the first output sequence and the second output sequence to obtain a combined output sequence, wherein the combiner logic is configured to add or subtract a respective log-likelihood ratio calculated for each first subcarrier symbol with a respective log-likelihood ratio calculated for the respective second subcarrier symbol to obtain a combined log-likelihood ratio for a respective bit of the bit sequence; and
output the combined output sequence comprising a respective combined log-likelihood ratio for each bit of the bit sequence;

wherein the first subcarrier and the second subcarrier are both modulated using 16-Quadrature Amplitude Modulation (QAM);

wherein the soft-output decoder logic is configured to:
calculate, for each of the first subcarrier symbols, four respective log-likelihood ratios and generate the first output sequence comprising the respective log-likelihood ratios calculated for the first subcarrier symbols; and calculate, for each of the second subcarrier symbols, four respective log-likelihood and generate the second output sequence comprising the respective log-likelihood ratios calculated for the second subcarrier symbols, and wherein the combiner logic is configured, for each integer J that is a multiple of four and less the length of the bit sequence, to:

add a respective log-likelihood ratio corresponding to a sequence position J in the first output sequence to a respective log-likelihood ratio corresponding to a sequence position J+1 in the second output sequence to obtain a first combined log-likelihood ratio;

add a respective log-likelihood ratio corresponding to a sequence position J+1 in the first output sequence to a respective log-likelihood ratio corresponding to a sequence position J in the second output sequence to obtain a second combined log-likelihood ratio;

add a respective log-likelihood ratio corresponding to a sequence position J+2 in the first output sequence to a respective log-likelihood ratio corresponding to a sequence position J+3 in the second output sequence to obtain a third combined log-likelihood ratio; and add a respective log-likelihood ratio corresponding to a sequence position J+3 in the first output sequence to a respective log-likelihood ratio corresponding to a sequence position J+2 in the second output sequence to obtain a fourth combined log-likelihood ratio.

14. The receiver apparatus of claim 13, wherein the soft-output decoder logic comprises Multiple Input Multiple Output (MIMO) decoder logic.

* * * * *